United States Patent
Kazmi

(10) Patent No.: US 8,090,343 B2
(45) Date of Patent: Jan. 3, 2012

(54) OPTIMIZED CAMEL TRIGGERING FOR PREPAID CALLING

(75) Inventor: Mustafa Anwar Kazmi, Atlanta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 1190 days.

(21) Appl. No.: 11/754,808

(22) Filed: May 29, 2007

(65) Prior Publication Data

US 2008/0299967 A1  Dec. 4, 2008

(51) Int. Cl.
*H04M 11/00* (2006.01)

(52) U.S. Cl. ........ 455/405; 455/406; 455/407; 455/408; 379/114.2; 379/114.15; 379/114.17; 379/114.18

(58) Field of Classification Search .......... 455/406–408; 379/114.2, 114.15, 114.17, 114.18, 114.28
See application file for complete search history.

(56) References Cited

U.S. PATENT DOCUMENTS

| | | |
|---|---|---|
| 5,123,111 A | 6/1992 | Delory et al. |
| 5,353,335 A | 10/1994 | D'Urso et al. |
| 5,355,406 A | 10/1994 | Chencinski et al. |
| 5,448,633 A | 9/1995 | Jamaleddin et al. |
| 5,488,650 A | 1/1996 | Greco et al. |
| 5,493,608 A | 2/1996 | O'Sullivan |
| 5,511,114 A | 4/1996 | Stimson et al. |
| 5,537,594 A | 7/1996 | Shannon et al. |
| 5,592,535 A | 1/1997 | Klotz |
| 5,722,067 A | 2/1998 | Fougnies et al. |
| 5,737,393 A | 4/1998 | Wolf |
| 5,737,701 A | 4/1998 | Rosenthal et al. |
| 5,771,276 A | 6/1998 | Wolf |
| 5,812,639 A | 9/1998 | Bartholomew et al. |
| 5,867,570 A | 2/1999 | Bargout et al. |
| 5,946,380 A | 8/1999 | Cohen et al. |
| 5,978,456 A | 11/1999 | Takeuchi et al. |

(Continued)

FOREIGN PATENT DOCUMENTS

EP  1030506  8/2000

(Continued)

OTHER PUBLICATIONS

International Search Report and Written Opinion of the International Searching Authority mailed Feb. 9, 2009 for PCT App. No. PCT/US2008/056385, 12 pages.

(Continued)

*Primary Examiner* — Kamran Afshar
*Assistant Examiner* — Dung Lam
(74) *Attorney, Agent, or Firm* — Zagorin O'Brien Graham LLP

(57) ABSTRACT

A method and system for streamlining the call processing for a prepaid call in a mobile telecommunications network is provided. A trigger detection point (TDP) for processing an originating call placed by a prepaid wireless subscriber, which may be called "O-Answer," is defined in a mobile user's subscription information stored in the prepaid subscriber's home location register (HLR). An additional TDP for an incoming call to a prepaid subscriber as a terminating party, which may be called "T-Answer," also is defined in the prepaid subscriber's subscription information stored in the HLR. If the prepaid mobile subscriber's account balance is above a threshold amount, the call can be processed using the O-Answer and T-Answer TDPs without the need to contact the prepaid platform for authorization, thus reducing the amount of signaling required to process a prepaid call.

18 Claims, 14 Drawing Sheets

U.S. PATENT DOCUMENTS

| | | |
|---|---|---|
| 5,991,407 A | 11/1999 | Murto |
| 5,991,748 A | 11/1999 | Taskett |
| 5,995,822 A | 11/1999 | Smith et al. |
| 6,014,428 A | 1/2000 | Wolf |
| 6,018,652 A | 1/2000 | Frager et al. |
| 6,037,880 A | 3/2000 | Manion |
| 6,058,300 A | 5/2000 | Hanson |
| 6,061,433 A | 5/2000 | Polcyn et al. |
| 6,070,067 A | 5/2000 | Nguyen et al. |
| 6,075,855 A | 6/2000 | Christiansen et al. |
| 6,115,601 A | 9/2000 | Ferreira |
| 6,122,510 A | 9/2000 | Granberg |
| 6,144,847 A | 11/2000 | Altschul et al. |
| 6,144,938 A | 11/2000 | Surace et al. |
| 6,157,823 A | 12/2000 | Fougnies et al. |
| 6,167,251 A | 12/2000 | Segal et al. |
| 6,169,975 B1 | 1/2001 | White et al. |
| 6,181,785 B1 | 1/2001 | Adams et al. |
| 6,185,414 B1 | 2/2001 | Brunner et al. |
| 6,185,545 B1 | 2/2001 | Resnick et al. |
| 6,188,752 B1 | 2/2001 | Lesley |
| 6,195,543 B1 | 2/2001 | Granberg |
| 6,205,326 B1 | 3/2001 | Tell et al. |
| 6,236,851 B1 | 5/2001 | Fougnies et al. |
| 6,240,284 B1 | 5/2001 | Bugnon et al. |
| 6,253,072 B1 | 6/2001 | Verdonk |
| 6,256,504 B1 | 7/2001 | Tell et al. |
| 6,327,363 B1 | 12/2001 | Henderson et al. |
| 6,333,976 B2 | 12/2001 | Lesley |
| 6,345,181 B1 | 2/2002 | Janhonen et al. |
| 6,363,411 B1 | 3/2002 | Dugan et al. |
| 6,373,930 B1 | 4/2002 | McConnell et al. |
| 6,377,938 B1 | 4/2002 | Block et al. |
| 6,393,269 B1 | 5/2002 | Hartmaier et al. |
| 6,397,055 B1 | 5/2002 | McHenry et al. |
| 6,404,869 B1 | 6/2002 | Henderson et al. |
| 6,404,880 B1 | 6/2002 | Stevens |
| 6,411,803 B1 | 6/2002 | Malachowski et al. |
| 6,424,706 B1 | 7/2002 | Katz et al. |
| 6,424,840 B1 | 7/2002 | Fitch et al. |
| 6,434,126 B1 | 8/2002 | Park |
| 6,463,130 B1 | 10/2002 | Malik |
| 6,480,710 B1 | 11/2002 | Laybourn et al. |
| 6,487,277 B2 | 11/2002 | Beyda et al. |
| 6,487,401 B2 | 11/2002 | Suryanarayana et al. |
| 6,490,450 B1 | 12/2002 | Batni et al. |
| 6,493,547 B1 | 12/2002 | Raith |
| 6,496,690 B1 | 12/2002 | Cobo et al. |
| 6,496,691 B1 | 12/2002 | Easley et al. |
| 6,507,644 B1 | 1/2003 | Henderson et al. |
| 6,516,190 B1 | 2/2003 | Linkola |
| 6,526,273 B1 | 2/2003 | Link, II et al. |
| 6,542,601 B1 | 4/2003 | Hernandez et al. |
| 6,567,657 B1 | 5/2003 | Holly et al. |
| 6,594,484 B1 | 7/2003 | Hitchings, Jr. |
| 6,625,268 B1 | 9/2003 | Wallenius |
| 6,625,439 B2 | 9/2003 | Laybourn et al. |
| 6,671,506 B1 | 12/2003 | Lee |
| 6,671,523 B1 | 12/2003 | Niepel et al. |
| 6,684,072 B1 | 1/2004 | Anvekar et al. |
| 6,705,520 B1 | 3/2004 | Pitroda et al. |
| 6,728,353 B1 | 4/2004 | Espejo et al. |
| 6,741,687 B1 | 5/2004 | Coppage |
| 6,748,066 B1 | 6/2004 | Espejo et al. |
| 6,771,950 B1 | 8/2004 | Shupe et al. |
| 6,904,035 B2 | 6/2005 | Requena |
| 6,912,383 B1 | 6/2005 | Li et al. |
| 6,934,529 B2 | 8/2005 | Bagoren et al. |
| 6,950,876 B2 | 9/2005 | Bright et al. |
| 6,957,058 B2 | 10/2005 | Chan et al. |
| 6,975,852 B1 | 12/2005 | Sofer et al. |
| 6,987,969 B1 | 1/2006 | Brunig et al. |
| 7,050,811 B2 | 5/2006 | Grech et al. |
| 7,088,987 B1 | 8/2006 | Espejo et al. |
| 7,123,703 B2 | 10/2006 | Hausmann et al. |
| 7,133,685 B2 | 11/2006 | Hose et al. |
| 7,184,748 B2 | 2/2007 | Espejo et al. |
| 7,209,890 B1 | 4/2007 | Peon et al. |
| 7,215,942 B1 | 5/2007 | McQuaide, Jr. et al. |
| 7,231,201 B2 | 6/2007 | Espejo et al. |
| 7,280,645 B1 | 10/2007 | Allen et al. |
| 7,330,110 B1 | 2/2008 | Heintzman et al. |
| 7,356,328 B1 | 4/2008 | Espejo et al. |
| 7,463,889 B1 | 12/2008 | DiPrima et al. |
| 7,466,806 B2 | 12/2008 | Espejo et al. |
| 7,480,710 B1 | 1/2009 | Olson et al. |
| 7,529,538 B2 | 5/2009 | Espejo et al. |
| 7,539,629 B1 | 5/2009 | Peon et al. |
| 7,609,682 B2 | 10/2009 | Ang et al. |
| 7,653,377 B1 | 1/2010 | Espejo et al. |
| 7,706,792 B1 | 4/2010 | DiPrima et al. |
| 7,907,937 B2 | 3/2011 | Engelhart |
| 2001/0001321 A1 | 5/2001 | Resnick et al. |
| 2001/0028705 A1 | 10/2001 | Adams et al. |
| 2001/0049656 A1 | 12/2001 | Halkosaari et al. |
| 2002/0029189 A1 | 3/2002 | Titus et al. |
| 2002/0077829 A1 | 6/2002 | Brennan et al. |
| 2002/0091572 A1 | 7/2002 | Anderson et al. |
| 2002/0104090 A1 | 8/2002 | Stettner |
| 2002/0107007 A1 | 8/2002 | Gerson |
| 2002/0107738 A1 | 8/2002 | Beach et al. |
| 2002/0111153 A1 | 8/2002 | Hartmaier et al. |
| 2002/0115424 A1 | 8/2002 | Bagoren et al. |
| 2002/0143634 A1 | 10/2002 | Kumar et al. |
| 2002/0147658 A1 | 10/2002 | Kwan |
| 2002/0156683 A1 | 10/2002 | Stoutenburg et al. |
| 2002/0181710 A1 | 12/2002 | Adam et al. |
| 2002/0193093 A1 | 12/2002 | Henrikson et al. |
| 2002/0193100 A1 | 12/2002 | Riffe et al. |
| 2003/0002635 A1 | 1/2003 | Koch et al. |
| 2003/0026404 A1 | 2/2003 | Joyce et al. |
| 2003/0037176 A1 | 2/2003 | Dannehr et al. |
| 2003/0095566 A1 | 5/2003 | Bunting et al. |
| 2003/0119477 A1 | 6/2003 | Uppal et al. |
| 2003/0125042 A1 | 7/2003 | Olrik et al. |
| 2003/0126020 A1 | 7/2003 | Smith et al. |
| 2003/0143978 A1 | 7/2003 | Cooper |
| 2003/0157925 A1 | 8/2003 | Sorber et al. |
| 2003/0158960 A1 | 8/2003 | Engberg |
| 2004/0048599 A1 | 3/2004 | Kotaluoto et al. |
| 2004/0063423 A1 | 4/2004 | Kagay, Jr. |
| 2004/0097229 A1 | 5/2004 | Muhonen et al. |
| 2004/0103191 A1 | 5/2004 | Larsson |
| 2004/0132449 A1 | 7/2004 | Kowarsch |
| 2004/0185828 A1* | 9/2004 | Engelhart .................... 455/408 |
| 2004/0202187 A1 | 10/2004 | Kelly et al. |
| 2004/0228457 A1 | 11/2004 | Espejo et al. |
| 2005/0009499 A1 | 1/2005 | Koster |
| 2005/0075106 A1 | 4/2005 | Jiang |
| 2005/0101292 A1 | 5/2005 | Fukui |
| 2005/0148319 A1 | 7/2005 | Himeno |
| 2005/0164707 A1 | 7/2005 | Batni et al. |
| 2005/0250493 A1 | 11/2005 | Elkarat et al. |
| 2005/0250501 A1 | 11/2005 | Mobin et al. |
| 2005/0262355 A1 | 11/2005 | Banet et al. |
| 2006/0003736 A1 | 1/2006 | Chan et al. |
| 2006/0003766 A1 | 1/2006 | Parameswar et al. |
| 2006/0023856 A1 | 2/2006 | Welton |
| 2006/0058010 A1 | 3/2006 | Williams et al. |
| 2006/0058049 A1 | 3/2006 | McLaughlin et al. |
| 2006/0073808 A1 | 4/2006 | Buchert |
| 2006/0240820 A1 | 10/2006 | Jiang |
| 2006/0240822 A1 | 10/2006 | Jiang |
| 2007/0049247 A1 | 3/2007 | Espejo et al. |
| 2007/0106569 A1 | 5/2007 | McQuaide et al. |
| 2007/0205263 A1 | 9/2007 | Peon et al. |
| 2007/0281687 A1 | 12/2007 | Jiang |
| 2008/0014933 A1 | 1/2008 | Montz et al. |
| 2008/0096525 A1 | 4/2008 | Engelhart |
| 2008/0119162 A1 | 5/2008 | Sivalingam et al. |
| 2008/0207181 A1 | 8/2008 | Jiang |
| 2008/0261559 A1 | 10/2008 | Cai et al. |
| 2009/0234747 A1 | 9/2009 | Peon et al. |
| 2010/0105369 A1 | 4/2010 | DiPrima et al. |

FOREIGN PATENT DOCUMENTS

| EP | 1039764 | 9/2000 |
|---|---|---|
| EP | 1372089 | 12/2003 |
| WO | WO9216078 | 9/1992 |
| WO | 9821874 | 5/1998 |
| WO | 9918713 | 4/1999 |
| WO | 0019702 | 4/2000 |
| WO | 0025507 | 5/2000 |

OTHER PUBLICATIONS

Paulius Meskauskas, "Customised Applications for Mobile Enhanced Logic (CAMEL)," Research Seminar on Nomadic Computing, Department of Computer Science, University of Helsinki, 13 pages.

Zahid Ghadialy, "CAMEL: An Introduction," Jul. 25, 2004, printed from http://www.3g4g.co.uk/Tutorial/ZG/zg_camel.html, 11 pages.

David G. Smith, "An Introduction to GSM Enhancements for Operator Specific Services (CAMEL)," The Institute of Electrical Engineers, 1996, 9 pages.

Mouly, Michel and Pautet, Marie-Bernadette, "The GSM System," France, 1992, pp. 569-577.

3GPP TS 02.78 v7.2.0 (Dec. 2001) Technical Specification, "3rd Generation Partnership Project; Technical Specification Group Services and System Aspects; (CAMEL); Service definition—State 1 (Release 1998), "GSM® Global System for Mobile Communications, 34 pages.

U.S. Appl. No. 11/765,655, filed Jun. 20, 2007, titled, "Conditional Call Treatment for Prepaid Calls," naming inventor Mustafa Anwar Kazmi.

U.S. Appl. No. 11/781,459, filed Jul. 23, 2007, titled, "Dynamic Location-Based Rating for Prepaid Calls," naming inventor Charles Hamadi and Mustafa Anwar Kazmi.

U.S. Appl. No. 11/861,339, filed Sep. 26, 2007, titled, "Recovery of Lost Revenue in Prepaid Calls," naming inventor Mustafa Anwar Kazmi.

U.S. Appl. No. 11/846,277, filed Aug. 28, 2007, titled, "Decisionmaking for Dynamic Local Time Updates in a Prepaid Terminating Call," naming inventor Mustafa Anwar Kazmi.

U.S. Appl. No. 11/846,259, filed Aug. 28, 2007, titled, "Peak Off-Peak Rating for Prepaid Terminating Calls," naming inventor Mustafa Anwar Kazmi.

U.S. Appl. No. 11/846,299, filed Aug. 28, 2007, titled, "Determining Capability to Provide Dynamic Local Time Updates in a Prepaid Terminating Call," naming inventor Mustafa Anwar Kazmi.

Kislak, Ali, "'Camel,' 'Customised Applications for Mobile network Enhanced Logic,'" CAMEL & In, Demo Version 1.0, Jan. 19, 2002, 18 pages, retrieved Nov. 17, 2004 from URL: http://www.hotel-fiesta.com/4g-aliweb/MyDOCS/CAMELMExEin/CAMELin.htm.

Crowe, David, "Thirsty for new features? Get a CAMEL?", Cellular Networking Perspectives, David Crowe's Wireless Review Magazine Articles Protocols Section: Mar. 2001, 5 pages, retrieved Nov. 17, 2004 from URL: http://www.cnp-wireless.com/ArticleArchive/Wireless%20Review/200103%20CAMEL.html.

ITU-T Recommendation Q.762, "Signalling System No. 7—ISDN User Part general functions of messages and signals," International Telecommunications Union, Dec. 1999, 30 pages, URL: <https://staff.hti.bfh.ch/mdm1/Kursunterlagen/SS7/T-REC-Q.762.pdf>.

ITU-T Recommendation Q.763, "Signalling System No. 7—ISDN User Part formats and codes," International Telecommunications Union, Dec. 1999, 134 pages, URL: <https://staff.hti.bfh.ch/mdm1/Kursunterlagen/SS7/T-REC-Q.763.pdf>.

3rd Generation Partnership Project; Technical Specification Group Core Network; Customised Applications for Mobile network Enhanced Logic (CAMEL) Phase 4; CAMEL Application Part (CAP) specification (Release 5), 3GPP TS 29.078 5.0.0 (Jun. 2002), 222 pages.

Cloward, William H., "Sophisticated, High Speech Capacity Voice Response Application for End Users," Official Proceedings of Speech Tech '86, Media Dimensions, Inc., Apr. 30, 1986, pp. 58/61.

Joe Gadget, Purchase Coca Cola Using Your Cellphone in Japan, http://http://www.techfresh.net/gadgets/misc-gadgets/purchase-coca-cola-using-cellphone-in-japan/, Sep. 29, 2006, 5 pages.

Levy, Ira D., "Keeping the bells ringing: Account replenishment in near real time", TMA Journal, v19n2, p. 24/26, Mar./Apr. 1999.

Moshavi, Sharon, "Please Deposit No Cents," Forbes, Aug. 16, 1993, 1 page.

Non-Final Office Action mailed Mar. 12, 2010 in U.S. Appl. No. 11/781,459, 15 pages.

Non-Final Office Action mailed Sep. 1, 2010 in U.S. Appl. No. 11/846,259, 11 pages.

Non-Final Office Action mailed Aug. 31, 2010 in U.S. Appl. No. 11/846,277, 8 pages.

Non-Final Office Action mailed Aug. 19, 2010 in U.S. Appl. No. 11/846,299, 10 pages.

\* cited by examiner

OPTIMIZED CAMEL TRIGGERING FOR PREPAID CALLING

FIELD OF ART

Aspects described herein relate to use of Camel triggers in a mobile communications system to provide an efficient signaling method and system for setting up prepaid calls for a subscriber who has a high prepaid account balance or who is otherwise eligible to make or receive a call.

BACKGROUND

The use of mobile communications devices has become commonplace in today's society. As consumers of mobile communications services become more sophisticated, it becomes more important for service providers to offer more and better services in order to fully meet their subscribers' needs. Such value-added services have become an integral part of the consumer's expectations regarding their mobile communications service.

Many of these value-added services relate to the provision of Intelligent Network (IN) services such as video or music download services, automated call forwarding services, ringback tone services, prepaid services and the like. In the Global System for Mobile Communications (GSM), the Customized Application of Mobile Enhanced Logic (Camel) standard has been developed to aid GSM operators to offer operator-specific services to their subscribers, even if a subscriber is roaming outside their home network. These services can include call processing functions such as caller ID and call screening, call forwarding, call rerouting; charging functions such as location-based charging or personal discounts; and provision of tones and announcements to provide information regarding a call to a subscriber's mobile telephone. Camel protocol is defined in a set of standards established by the ETSI (European Telecommunication Standardization Institute) and later upgraded as part of 3GPP (Third Generation Partnership Project) initiative. These standards can be found at http://webapp.etsi.org/key/queryform.asp.

Information regarding Camel networks can be found in many publications. The most comprehensive work on Camel, including the latest standardization enhancements, can be found in the book entitled, *Camel, Intelligent Network for the GSM, GPRS and UMTS Networks* by Rogier Noldus published by John, Wiley & Sons Limited (2006). Other publications that describe the architecture and operation of a mobile network using Camel functionality include the publication by Paulius Meskauskas entitled, "Customised Applications for Mobile Enhanced Logic (Camel)," for the Research Seminar on Nomadic Computing for the Department of Computer Science at the University of Helsinki; the Camel tutorial by Zahid Ghadialy entitled, "Camel: An Introduction," (Jul. 25, 2004), available at http:/www.3g4g.co.uk/Tutorial/ZG/zg_camel.html; and "An Introduction to GSM Enhancements for Operator Specific Services (Camel)" (1996) by David G. Smith, published by the IEEE, Savoy Place, London. Information regarding Camel triggers and trigger detection points may also be found in U.S. Patent documents such as, for example, U.S. Pat. No. 7,050,811 to Grech et al. and U.S. Patent Application Publication No. 2003/0095566 to Bunting et al.

In accordance with the basic structure for a Camel network, information about a mobile subscriber is contained in a database in the subscriber's Home Location Register (HLR). This information includes the identity of the mobile station, subscriber information including a subscriber profile, presence information, call forwarding options, subscription to enhanced services such as packet data and the like. The HLR may also maintain Camel Subscription Information (CSI) for a mobile subscriber in a Camel network, and such a subscriber having CSI will be referred to herein as a "Camel subscriber." When a Camel subscriber performs a location update to a different MSC in a GSM network, her subscription information is transferred and maintained in the Visitor Location Register (VLR) for that MSC. In a GSM network, the VLR is a logical entity which is often co-located with the Mobile Switching Center (MSC). When a mobile subscriber having Camel services in her home network roams to another network, the Camel Subscription Information about that roaming subscriber is temporarily stored in the VLR for that network so that the enhanced services that the subscriber has in her home network are also available to her as she roams. This helps to make a consumer's mobile service truly mobile, since she will experience the same level of service as a "visitor" in another network as she does in her own home network.

Camel works to enable the provision of such "seamless" mobile service by providing a protocol, known as the Camel Application Part (CAP) for communication between a Mobile Switching Center (MSC) and a Service Control Point (SCP) handling a mobile call where the SCP is most often a part of the subscriber's home network. Camel also provides a Basic Call State Model (BCSM), which describes the different phases of call processing in the MSC. An Originating Basic Call State Model (O-BCSM) describes the call processing for a mobile-originated (MO) call, i.e., a call where the calling party is originating a call from her mobile device, whether the called device is a mobile or non-mobile device. Similarly, a Terminating Basic Call State Model (T-BCSM) describes the call processing to route a call when the mobile device is the recipient of an incoming call.

Both the O-BCSM and T-BCSM contain various points, or states, in the call processing between the MSC and the SCP. Each state is preceded by a transition step, or Detection Point (DP) where the call is handed over to the SCP for a determination whether the call can proceed to the next state. A DP in a Camel call can either be an Event Detection Point (EDP) or a Trigger Detection Point (TDP). An EDP is imposed by the SCP during processing of the call, and detects significant events during the call, such as an answer from the called party or disconnection by the calling or called party. A TDP is a part of the processing for all Camel calls by a subscriber in a network, and forms a part of a subscriber's Camel Subscription Information in the HLR. Both an EDP and TDP can be described as being "armed" if they have been activated and are available for use in processing the call.

Control of a call in a Camel network can be managed by the SCP and the MSC through the use of CAP operations. CAP operations from the SCP to the MSC can contain instructions regarding the handling of the call at that point. For example, Operation: RequestReportBCSMEvent is used to arm future DPs which contain instructions for future processing. CAP operations also are used to send messages between the MSC and the SCP regarding a status of the call. For example, Operation: EventReportBCSMEvent can be used by the MSC to report to the SCP that the call has been answered.

One of the services that Camel enables is prepaid mobile service, both for mobile originators and mobile recipients of calls in the mobile system. Prepaid mobile service is a popular option for many users. It can enable a user to enjoy the benefits of mobile communications without having to enter into a long-term contract. It also can be useful to facilitate management of mobile service, for example, as a parental control tool to manage a child's use of mobile services or as a management tool for corporate usage.

Camel enables a prepaid mobile user to both make and receive prepaid calls in both her home network and as a roamer in another network. The prepaid mobile caller's prepaid account is debited to pay charges applied for the call. Whether such a call is permitted by the network can depend on whether the subscriber's prepaid balance is sufficient to cover the call or whether the subscriber is otherwise eligible to complete the call.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter.

Aspects described herein relate to a method and system for reducing the signaling used in setting up a prepaid call for a mobile subscriber who has a high prepaid account balance or who is otherwise eligible to complete a call. A method and system for streamlining the call processing for a prepaid wireless call is provided. According to one or more aspects, a Camel Trigger Detection Point for a mobile originating call, which may be referred to as "O-Answer," is defined in a mobile user's Camel Subscription Information stored in the user's HLR. Similarly, a Camel Trigger Detection Point for a mobile terminating call, which may be referred to as "T-Answer," is defined in the mobile user's Camel Subscription Information stored in the HLR. If a prepaid mobile subscriber's account balance is above a threshold amount or the prepaid mobile subscriber is otherwise permitted to complete a call, the call can be processed using the O-Answer and T-Answer TDPs without the need to contact the prepaid platform for authorization, thus reducing the amount of signaling required to process a prepaid call.

DETAILED DESCRIPTION

The aspects summarized above can be embodied in various forms. The following description shows, by way of illustration, combinations and configurations in which the aspects can be practiced. It is understood that the described aspects and/or embodiments are merely examples. It is also understood that other aspects and/or embodiments can be utilized, and structural and functional modifications can be made, without departing from the scope of the present disclosure. For example, although some aspects herein relating to an eligibility of a prepaid mobile subscriber to make or receive a call is described in the context of sufficiency of the subscriber's prepaid account balance, it should be noted that eligibility of a subscriber to make or receive a call can be based on any criteria established by a mobile telecommunications service. A caller's eligibility also can be based on the call being placed from or to a special location where all calls are allowed, such as an area where a hurricane or other disaster has struck, or the call being placed at a special time, such as during a special promotional time. Also, although some aspects herein are described in the context of a mobile user in a "roaming" mode as a visitor in another network, it is known in the art that from the point of view of signaling, all mobile users are considered to be roamers, with "home" being simply a special case of roaming. Thus, one skilled in the art would readily understand that aspects described herein in the context of a "roaming" mobile user are equally applicable to a mobile user in her home network. In addition, although the aspects herein are described in the context of a particular Basic Call State Model using particular nomenclature for the steps and operations therein, it should be noted that variations in call state configurations and protocols may be used to process prepaid mobile calls in a Camel network and that such variations in configuration and protocol are within the scope of the present disclosure.

Figure 1:
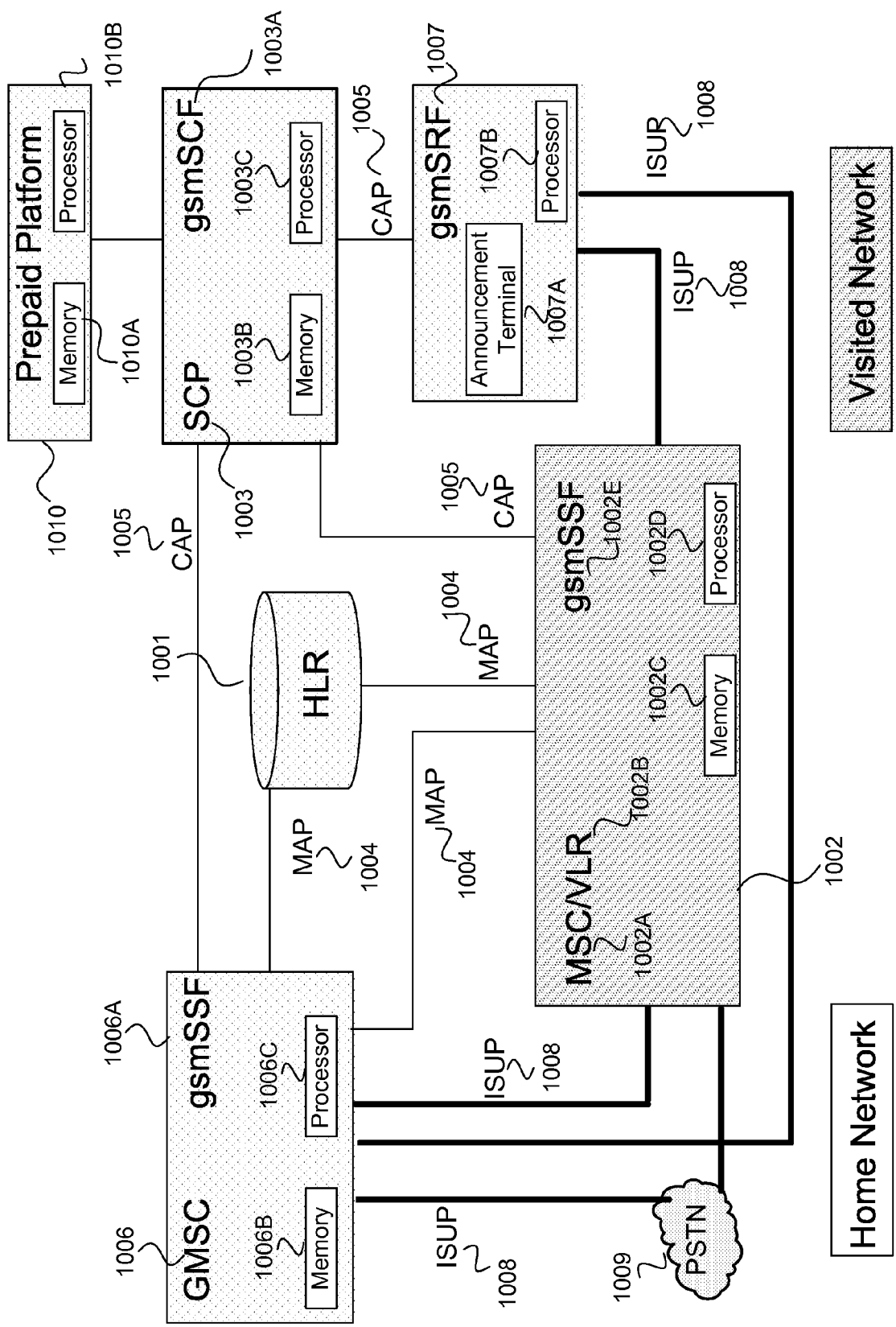
FIG. 1 is a block diagram depicting network elements in a conventional Camel network.

FIG. 1 depicts exemplary network elements that can be utilized in a conventional Camel network. Signaling for call set up and call tear-down between network elements shown in FIG. 1 can be accomplished using ISDN User Part (ISUP) 1008, which is a part of the Signaling System #7 (SS7) communications protocol for signaling originating and terminating switching locations of telephone calls in a Public Switched Telephone Network (PSTN) 1009. The PSTN merely shows the entity where the other party in a telephone call may reside; i.e. the other party can be either a mobile subscriber or a fixed line subscriber.

As shown in the configuration depicted in FIG. 1, an exemplary Camel network can include a Home Location Register (HLR) 1001, which can hold the Camel Subscription Information (CSI) for each subscriber in the Camel network. The CSI for a subscriber can include subscription information regarding call processing and call feature enhancements. The set of information provisioned in the HLR for the control of a mobile originating call is known as O-CSI. This includes the set of TDP that can intercept the processing of an originating call and also includes a set of parameters to control the actions at each of those TDPS. In a similar manner, the set of information provisioned in the HLR for the control of a terminating call to a mobile subscriber as recipient of the call is known as "T-CSI." The T-CSI for a terminating mobile subscriber can include the set of TDPs that can intercept the processing of a terminating call towards that subscriber and a set of parameters to control the actions at each of those TDPs.

The exemplary Camel network shown in FIG. 1 also can include a Mobile Switching Center/Visiting Location Register (MSC/VLR) 1002. The MSC/VLR 1002 can include a Mobile Switching Center (MSC) 1002A, memory 1002C, and processor 1002D that receives and processes a mobile subscriber's request to make a call, and a database of roaming mobile subscribers within the MSC's service area, known in the art as a Visiting Location Register (VLR) 1002B. In accordance with conventional mobile call processing methods, when a mobile subscriber enters an area served by MSC 1002A, the subscriber's location is updated in the HLR to point to VLR 1002B. During such an update, VLR 1002B also can be updated to include the subscriber's Originating Camel Subscription Information (O-CSI) from the HLR 1001 via Mobile Application Part (MAP) (1004). MSC 1002A can then use the visiting mobile subscriber's O-CSI to govern processing of an outgoing mobile call originated by the subscriber. The exemplary Camel network shown in FIG. 1 can also include Service Control Point (SCP) 1003, which includes a memory 1003A and a processor 1003B. In accordance with a conventional Camel network, the address for the SCP in a subscriber's home network is part of the subscriber's O-CSI that is obtained during an update of the VLR. During outgoing call setup for a mobile subscriber, MSC/VLR 1002 can contact SCP 1003 using GSM Service Switching Function (gsmSSF) 1002E within MSC/VLR 1002 by way of Camel Application Part (CAP) protocol 1005, to inform SCP 1003 that the caller is a Camel subscriber and that the call should be processed by Service Control Function gsmSCF 1003A.

The exemplary Camel network shown in FIG. 1 also depicts network elements that can be used to process an incoming (terminating) call to a Camel mobile subscriber. When a call is made to a mobile user in the network, the call can be received by a Gateway Mobile Switching Center 1006, which also includes GSM Service Switching Function (gsmSSF) 1006A, memory 1006B, and processor 1006C. As shown in FIG. 1, when an incoming call directed to a mobile subscriber in a Camel network is received, GMSC 1006 can fetch the Terminating Camel Subscription Information (T-CSI) from that mobile subscriber's HLR 1001 via Mobile Application Part (MAP) 1004. Once the T-CSI is received from the HLR 1001, in a similar manner as for an outgoing call, GMSC 1006 can contact Service Control Point (SCP) 1003 using gsmSSF 1006A within GMSC 1006 by way of Camel Application Part (CAP) protocol 1005 to inform the SCP that the caller is a Camel subscriber and that the call should be processed by Service Control Function gsmSCF 1003A.

SCP 1003 also can obtain information regarding the mobile subscriber from Prepaid Platform 1010 having memory 1010A and processor 1010B. Memory 1010A in Prepaid Platform 1010 contains information regarding a prepaid mobile subscriber's prepaid account, for example, account balance, call charging history, and special rate information, if any, and processor 1010B can calculate a prepaid subscriber's account balance and available funds and determine whether a prepaid subscriber has sufficient funds for a call.

FIG. 1 also depicts Specialized Resource Function gsmSRF 1007, which may contain an Announcement Terminal 1007A, as an element of a conventional Camel network. The SCP 1003 can instruct the MSC/VLR 1002A or GMSC 1006, depending on whether the call is an outgoing or terminating call, to set up a speech path to gsmSRF 1007 via, for example, Camel Operation Establish Temporary Connection. The gsmSRF 1007, in turn, contacts the SCP 1003 via CAP 1005 and receives messages from SCP 1003 via CAP 1005 that enables the gsmSRF to play one or more message to a caller. For example, if processor 1010B in Prepaid Platform 1010 determines that a subscriber's prepaid account balance has fallen below a predetermined limit, Prepaid Platform 1010 can instruct SCP 1003 to cause Announcement Terminal 1007A to play a message informing the caller that the balance in the subscriber's prepaid account is insufficient to permit the call to be completed.

A subscriber's HLR in a Camel network is "armed" with various Camel Trigger Detection Points (TDPs). A detection point (DP) can be described as being "armed" if it has been activated and is available for use in processing the call. Alternatively, a DP can be "suppressed" if it has not been activated or has been deactivated and is thus not available for use in processing the call. These TDPs can be predefined in a Camel network and can form part of the subscriber's Camel subscription profile in the HLR. These TDPs are "armed" from the outset of the call processing and can determine at what point in the call the MSC will communicate with the SCP and can determine the nature and content of that communication.

For a prepaid mobile subscriber in a conventional Camel network, a call made by that prepaid subscriber (also known as an "originating call") can involve a TDP known as "DP2-Collected Information" during the call set-up phase. Similarly, a call made to that prepaid subscriber (also known as a "terminating call") can involve a TDP known as "DP12-Terminating Attempt Authorized" during the call set-up phase. Output of each of DP2 and DP12 instructs the MSC to contact the SCP to determine whether the prepaid subscriber has sufficient funds in her prepaid account balance or is otherwise eligible to permit the call to go forward.

Figure 2A:
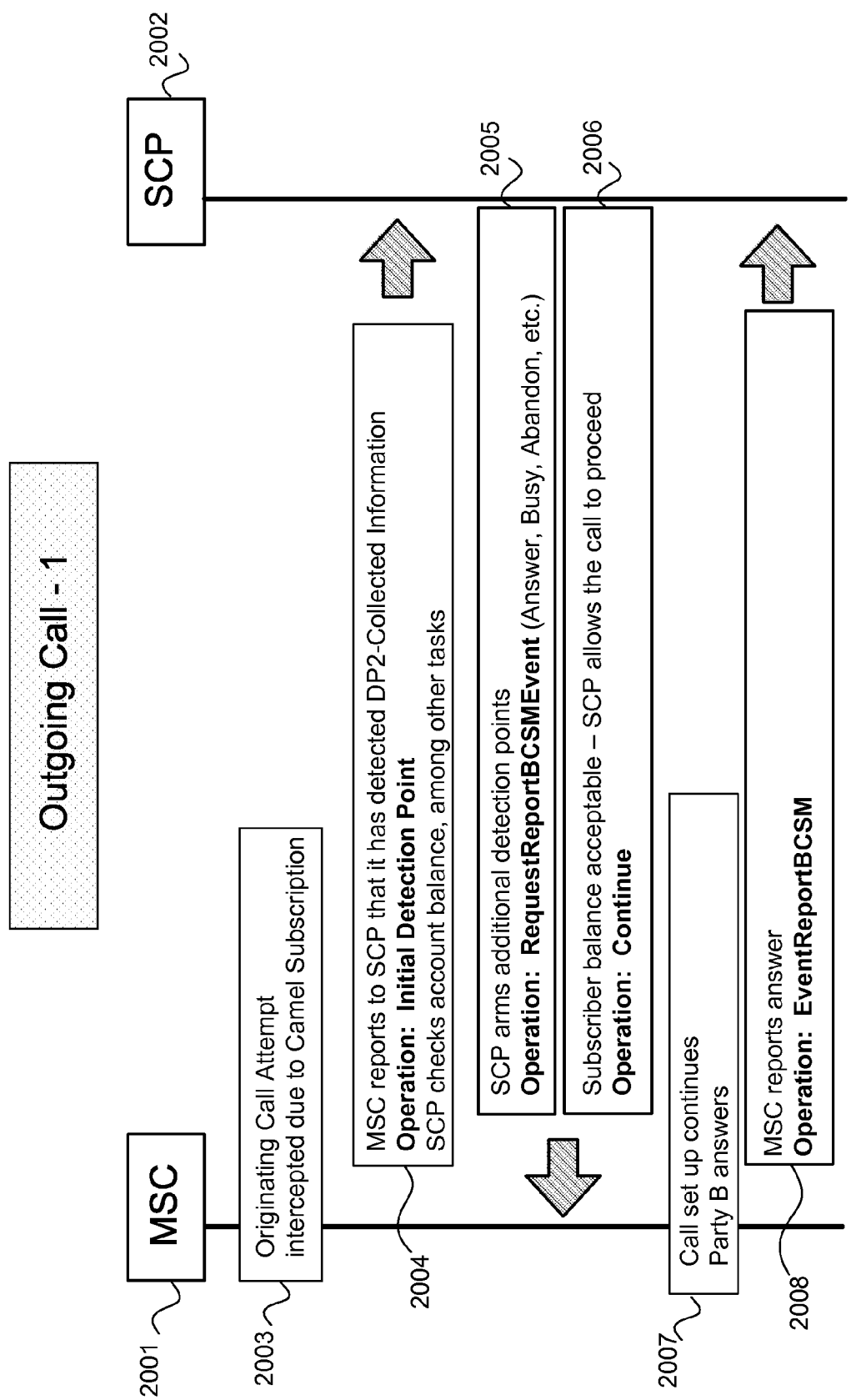
FIGS. 2A-2C depict a call flow in a Camel Originating Basic Call State Model in a mobile network in accordance with conventional methods.
Figure 2B:
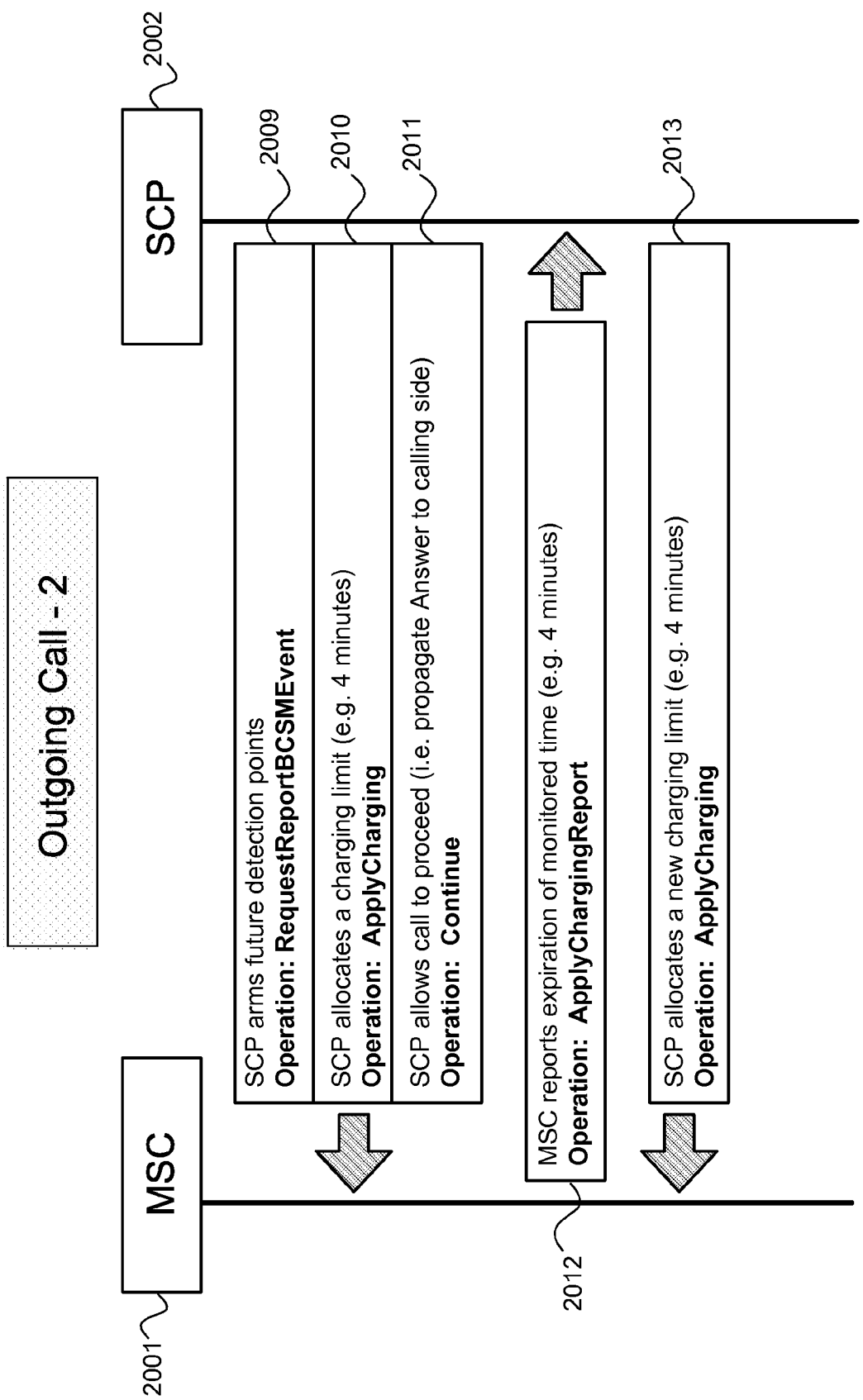
Figure 2C:
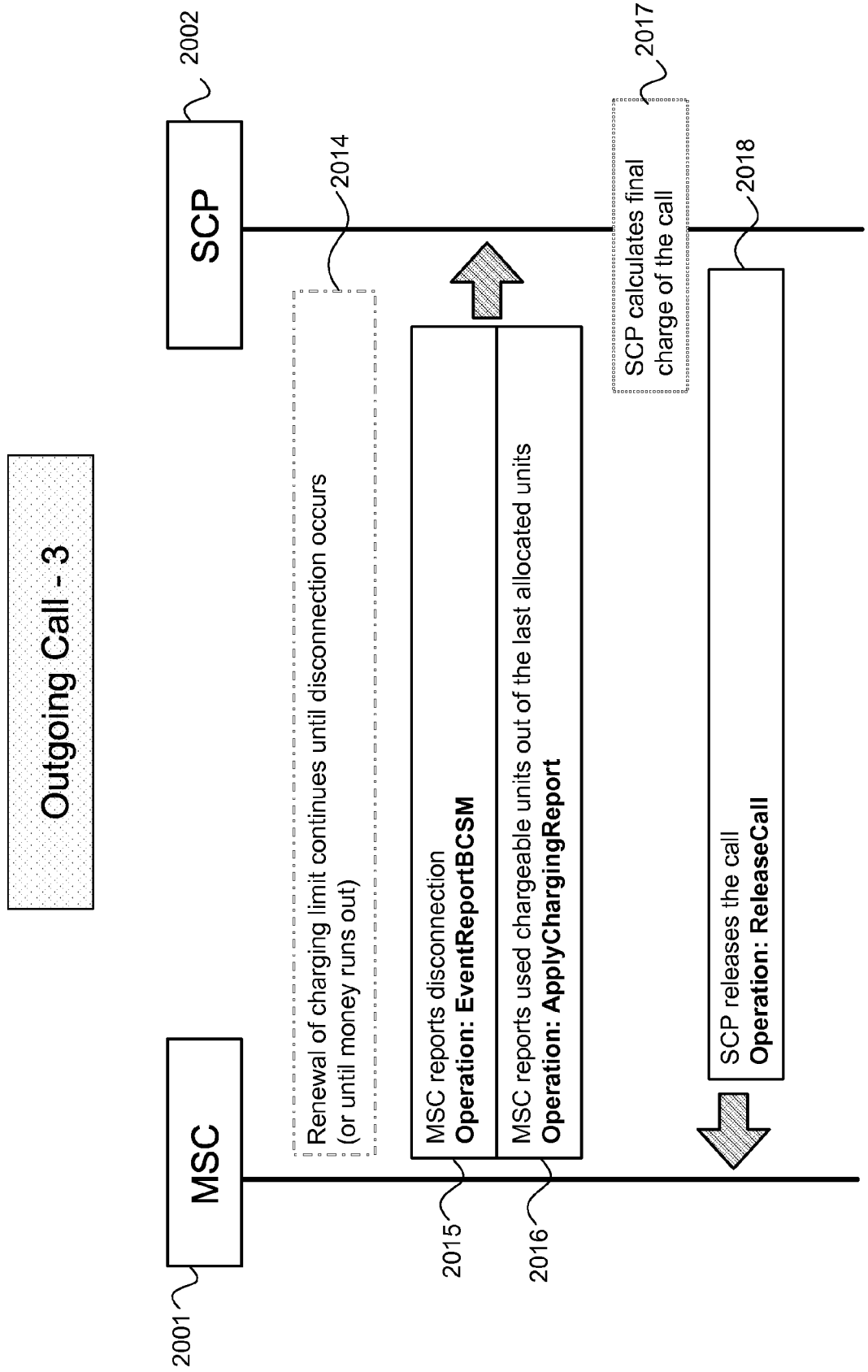

FIGS. 2A-2C depict an exemplary call flow for an originating prepaid call in a Camel network in accordance with conventional methods. As shown in FIGS. 2A-2C, the call processing involves information flow between MSC 2001 and SCP 2002. As shown in FIG. 2A, at step 2003 in the call processing flow, a prepaid subscriber's outgoing (originating) call is intercepted due to the presence of a Camel subscription in the caller's network. At step 2004, MSC 2001 reports to SCP 2002 via the Operation: Initial Detection Point that an originating call attempt has been detected. At step 2005, SCP 2002 authorizes the call and uses the Operation: RequestReportBCSMEvent to arm one or more Event Detection Points in the call (for example, detection points relating to Answer, Busy, or Abandoned status of the call) and returns that information to MSC 2001. In addition, at step 2006, if SCP 2002 determined that the caller is eligible to complete the call, either because the caller's prepaid account balance is acceptable or otherwise, SCP 2002 returns a message to MSC 2001 via Operation: Continue instructing MSC 2001 to continue processing the call. If the prepaid calling party does not have sufficient funds in her account or not otherwise eligible to complete the call, the call processing ceases, and the calling party is informed that the call cannot be completed, for example, via a message played by Announcement Terminal 1007A shown in FIG. 1. If the caller is eligible to complete the call, for example, because her prepaid balance is sufficient, at step 2007 the call set up continues. When the called party answers, at step 2008, MSC 2001 reports to SCP 2002 via Operation: EventReportBCSM that the call has been answered.

FIG. 2B depicts additional call processing in a conventional Camel network after the prepaid mobile call has been answered. As shown in FIG. 2B, after the call has been answered, at steps 2009 through 2011, SCP 2002 sends several instructions to MSC 2001. At step 2009, SCP 2002 arms one or more future detection points in the call, for example, an Event Detection Point (EDP) for call disconnect, and advises MSC 2001 of those future detection points via, for example, Operation: RequestReportBCSMEvent. To ensure that a prepaid caller does not exceed her available prepaid account balance or otherwise exceeds her eligibility to continue a call, call processing in a Camel network provides a periodic allocation and monitoring of authorized time for the call. Thus, at step 2010, SCP 2001 allocates a charging limit, for example, 4 minutes, to the prepaid call, advises MSC 2001 of this charging limit via Operation: ApplyCharging, and instructs MSC 2001 to monitor for the expiration of this time period. At step 2011, SCP 2001 allows the call to proceed by instructing MSC 2001 via Operation: Continue. After the expiration of the charging limit time, that is, after the expiration of 4 minutes in the present example, via Operation: ApplyChargingReport, MSC 2001 reports to SCP 2002 that the monitored time has expired. If the caller's prepaid account balance is sufficiently high to cover an additional period or the caller is otherwise eligible to continue the call, at step 2013, SCP 2002 allocates a new charging limit, again, for example, 4 minutes, and advises MSC 2001 of this new charging limit via a second iteration of Operation: ApplyCharging.

As seen in FIG. 2C, in step 2014, the allocation and renewal of charging limits seen in steps 2010, 2012, and 2013 of FIG. 2B continues until the parties disconnect the call, the prepaid subscriber's prepaid money runs out, or the prepaid subscriber is no longer eligible to continue the call. Upon the occurrence of any of these events, at step 2015 MSC 2001 reports disconnection of the call to SCP 2002 via Operation: EventReportBCSM and at step 2016 reports the chargeable time units used out of the last time units allocated for the call. At step 2017, SCP 2002 calculates the final charge for the call, which will be applied to the prepaid subscriber's prepaid balance, and at step 2018, SCP 2018 instructs the MSC 2001 to release the call via Operation: ReleaseCall.

Figure 3A:
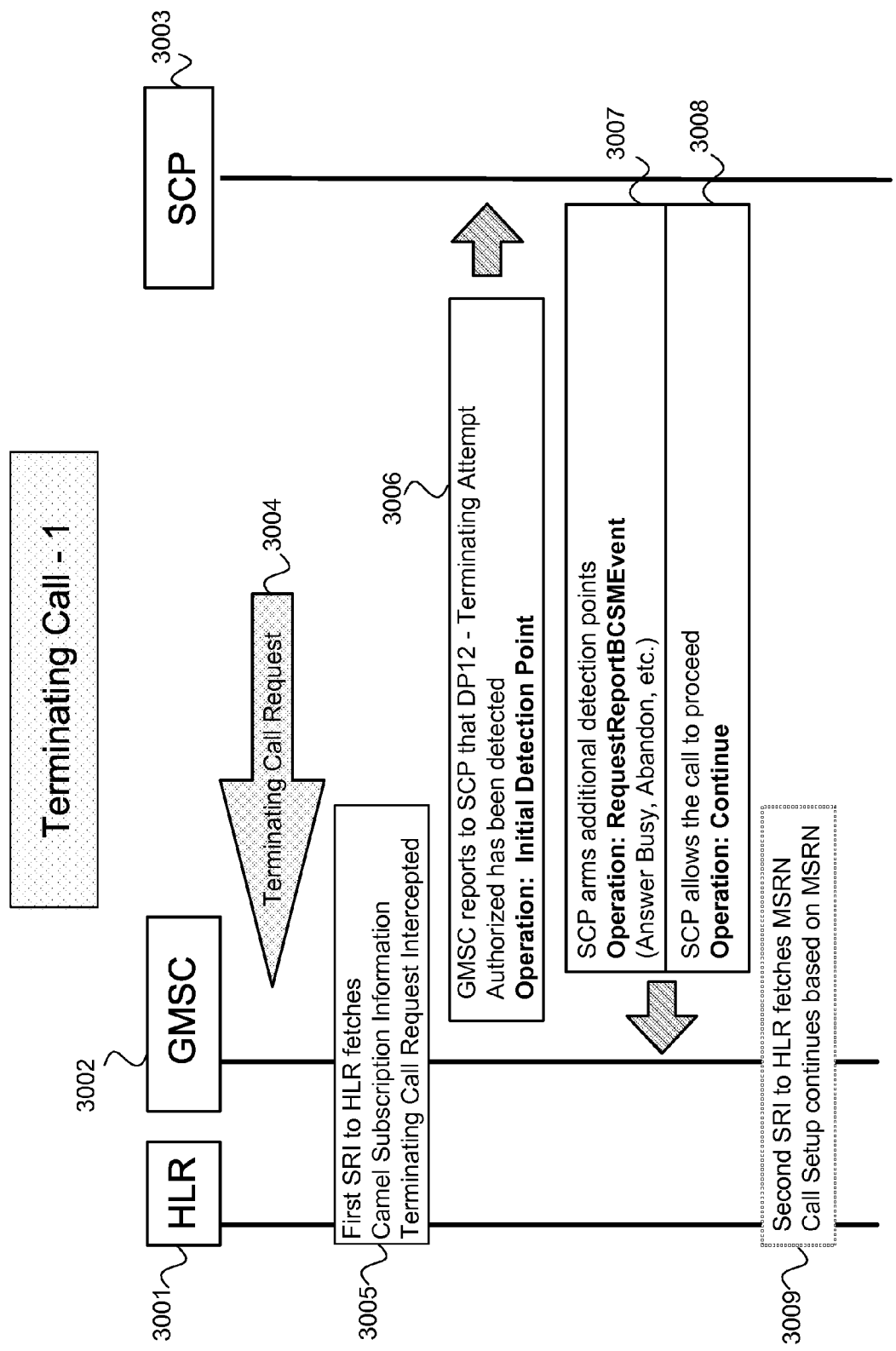
FIGS. 3A-3C depict a call flow in a Camel Terminating Basic Call State Model in a mobile network in accordance with conventional methods.
Figure 3B:
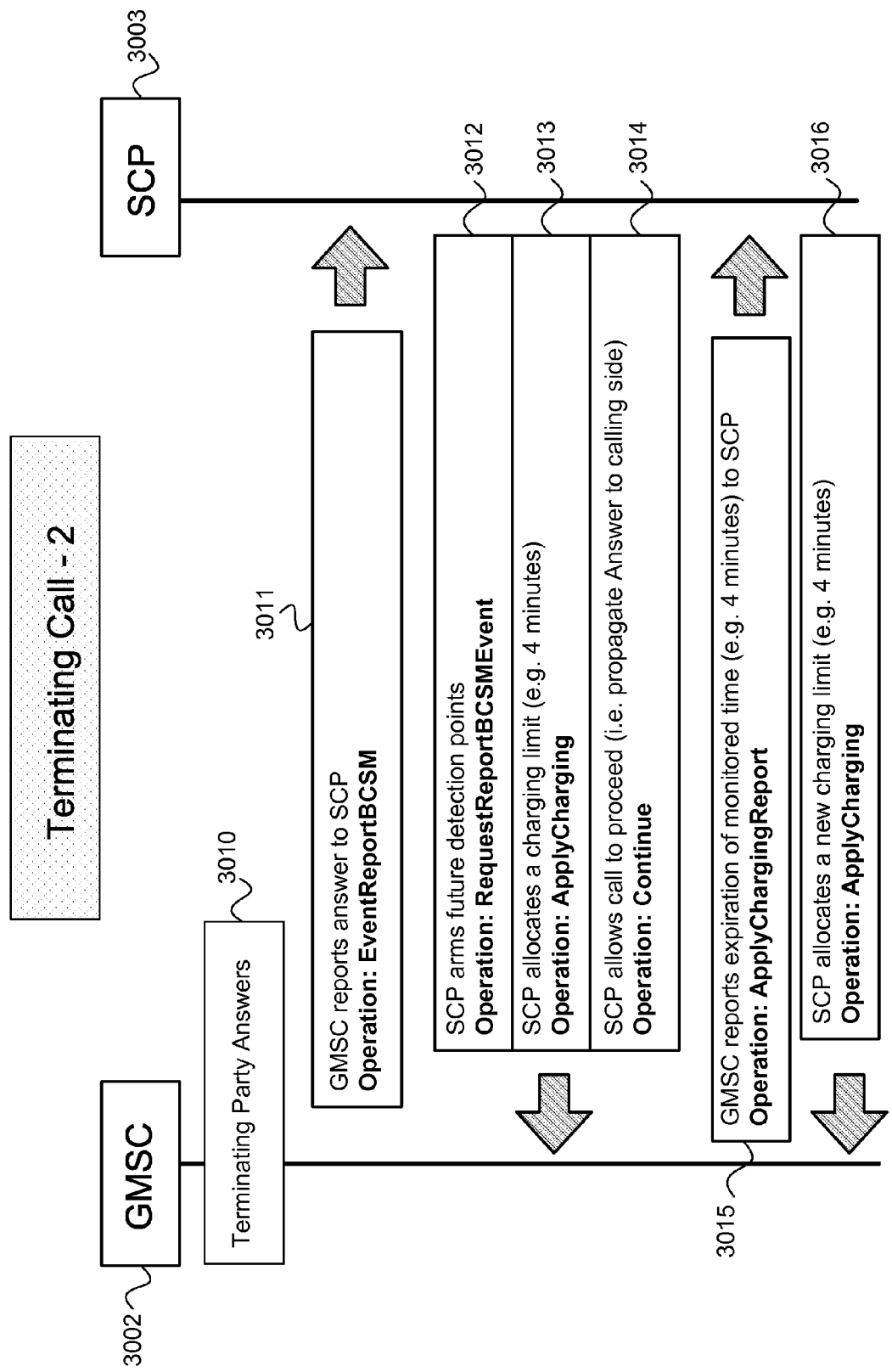
Figure 3C:
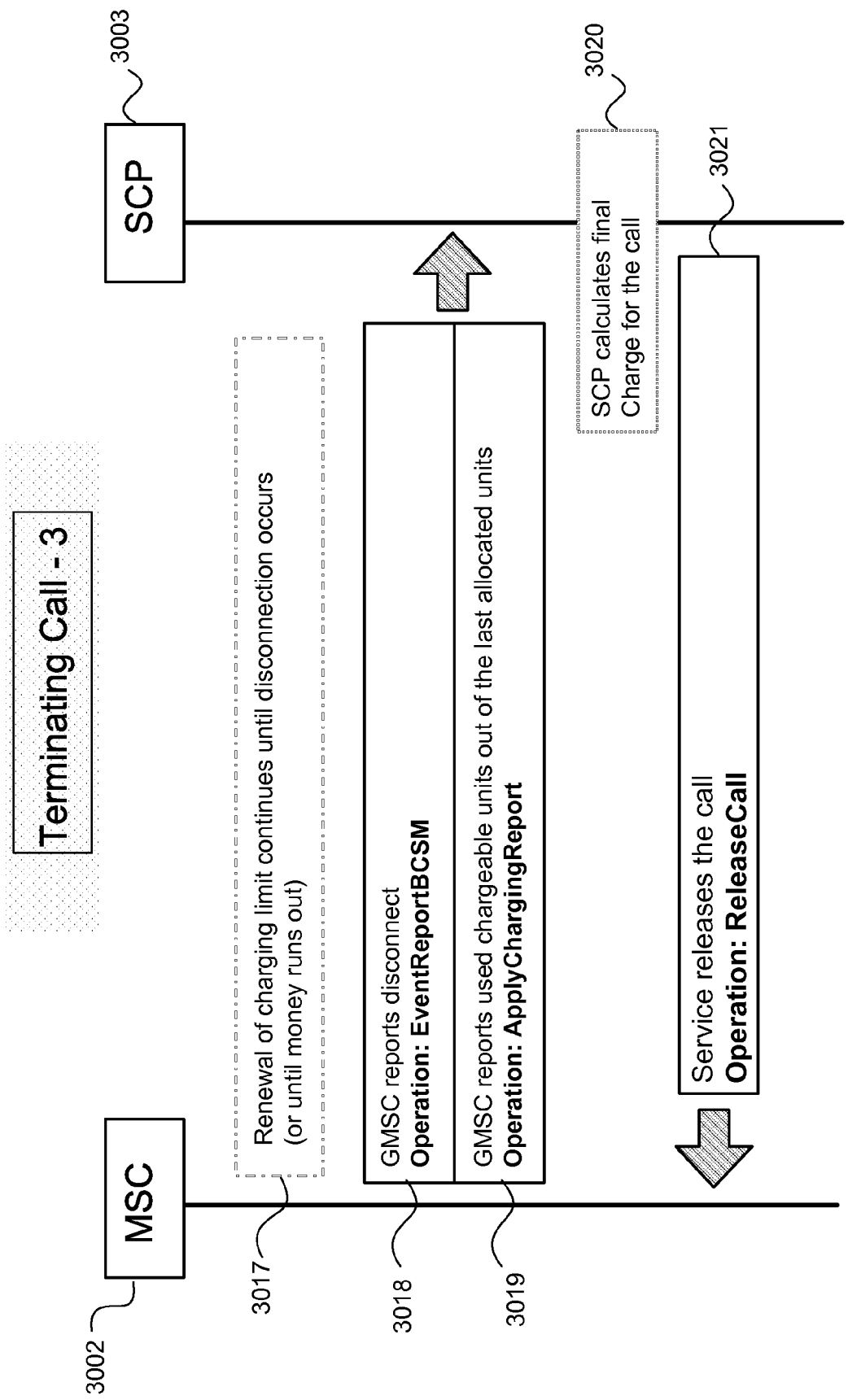

FIGS. 3A-3C depict a similar call processing flow in a Camel network using conventional methods for a call in which a prepaid subscriber is a recipient of a call. Such a call, also known as a "terminating call," involves a TDP known as "DP12-Terminating Attempt Authorized" during the call set-up phase as shown in FIG. 3A.

As shown in FIG. 3A, a terminating call is processed by messages sent between HLR 3001, GMSC 3002, and SCP 3003. As shown in FIG. 3A, a Terminating Call Request 3004, for example, an incoming call to a prepaid mobile subscriber in a Camel network, is directed to GMSC 3002. At step 3005, GMSC 3002 sends a first Send Routing Information (SRI) request to HLR 3001 to obtain information necessary to set up the incoming call. Due to the fact that the subscriber has T-CSI in the HLR, the HLR 3001 sends the call recipient's Camel Subscription Information (T-CSI). The recipient's T-CSI contains information regarding Camel subscription for the recipient of the call. At step 3006, GMSC 3002 reports to SCP 3003 via an Operation: Initial Detection Point that a Terminating Call Request has been received by GMSC 3002 and requests that the subscriber's balance be checked. At step 3006, SCP 3003 arms one or more Event Detection Points in the call (for example, detection points relating to Answer, or Busy, status of the call) via the Operation: RequestReportBCSMEvent and returns that information to GMSC 3002. In addition, at step 3008, if SCP 3003 has determined that the terminating party's prepaid account balance is sufficient to permit the call to proceed or the terminating party is otherwise eligible, SCP 3003 returns a message to GMSC 3002 via Operation: Continue instructing MSC 3002 to continue processing the call. Then, at step 3009, in accordance with the instruction sent in step 3008 from SCP 3003, GMSC 3002 sends a second SRI request to HLR 3001 and fetches a temporary routable number known as Mobile Station Routing Number (MSRN) so that GMSC 3002 can route the call to the mobile call recipient.

In FIG. 3B, additional call processing steps are shown. At step 3010, the terminating party answers the incoming call. At step 3011, GMSC 3002 reports that the call has been answered to SCP 3003 via Operation: EventReportBCSM. At step 3012, SCP 3003 arms future DPs for further call processing and advises GMSC 3002 of the arming of the DPs. For example, an EDP for disconnection of the call can be armed and the arming of this EDP can be requested to GMSC 3002 via Operation: RequestReportBCSMEvent. In a manner similar to processing for an outgoing call as described above, at step 3013, SCP 3003 also allocates a charging limit, for example, 4 minutes, to ensure that the prepaid subscriber does not exceed her prepaid service account balance and instructs GMSC 3002 to monitor for the expiration of this time period. At step 3014, SCP 3003 allows the call to proceed via Operation: Continue. GMSC 3002 monitors the time used in the call and at the expiration of the monitored time limit, in this case 4 minutes, at step 3015 GMSC 3002 reports the expiration of the monitored time to SCP 3003 via Operation: ApplyChargingReport. SCP 3003 then rechecks the called party's prepaid account balance and if it remains sufficient to allow the call to continue. If so, at step 3016, SCP 3003 allocates a new charging limit, for example, an additional 4 minutes, to the call and via Operation: ApplyCharging instructs GMSC 3002 to monitor for the expiration of this additional time period.

As seen in FIG. 3C, in step 3017, the allocation and renewal of charging limits seen in steps 3013, 3015, and 3016 of FIG. 3B continues until either disconnection of the terminating call occurs or the prepaid terminating party's prepaid money runs out. Upon the occurrence of either of these two events, at step 3018 GMSC 3002 reports disconnection of the call to SCP 3003 via Operation: EventReportBCSM and at step 3019 reports the chargeable time units used out of the last time units allocated for the call. At step 3020, SCP 3003 calculates the final charge for the call, which will be applied to the prepaid subscriber's prepaid balance, and at step 3021, SCP 3003 instructs the MSC 3002 to release the call via Operation: ReleaseCall.

According to conventional methods used in a Camel network as described above, a Trigger Detection Point (TDP) for an answer event in either of an originating call (O-Answer) or a terminating call (T-Answer) can be armed only if the MSC/GMSC is in contact with the SCP and receives instruction from the SCP to arm the Answer event and permit the call to go forward. This method requires messaging traffic between the MSC/GMSC and the SCP for each call on a prepaid subscriber's account.

According to one or more aspects described in more detail below, there is provided a method and system for reducing the messaging traffic needed to process a call request for a prepaid subscriber in a Camel network.

In a method and system according to one or more aspects described herein, an additional TDP can be established, for example, in the HLR as part of a prepaid subscriber's Camel Subscription Information (CSI). This additional TDP can be armed in the HLR if certain criteria are met, for example, if according to the information regarding the subscriber's prepaid account in the prepaid service platform, the subscriber's prepaid account balance is above a certain threshold amount or the subscriber is otherwise permitted to continue to make calls, for example, because the network is running a special promotion or the subscriber is in a special location. The required threshold amount can be set to any desired level by the network. For example, the threshold amount can be an amount applied to all subscribers as being necessary to cover the charges for a call of a specified duration. Alternatively, the threshold amount can be a variable amount that is tailored to a specific subscriber, for example, an amount necessary to cover the charge for a call of average length for that particular subscriber as determined, for example, by that subscriber's call history.

According to one or more aspects herein, each subscriber in a Camel network can thus have at least two TDPs that are armed in the HLR for an originating call. Two of these Trigger Detection Points can be known as "Collected Info" and "O-Answer." Similarly, each subscriber in a Camel network can have at least two TDPs armed in the HLR for a terminating call. Two of these TDPs can be known as "Terminating Attempt Authorized" and "T-Answer." It should be noted the names given to these TDPs are merely illustrative, and that skilled in the art would readily realize that other names for these TDPs can be used. Each of these triggers can be activated or suppressed by means of one or more commands sent by the Prepaid System to the HLR in a manner understandable by the HLR. The prepaid system can also send instructions to an operators provisioning gateway which in turn can instruct the HLR to activate or suppress one or more of these TDPs. In an exemplary method according to one or more aspects described herein, the TDPs "O-Answer" or "T-Answer" can be armed and can control processing of an outgoing or incoming call only if the prepaid subscriber's account balance is above a threshold amount or the prepaid subscriber is otherwise eligible to complete a call; otherwise the TDPs "Collected Info" for an outgoing call or "Terminating Attempt Authorized" for an incoming call can be armed and can govern call processing.

Thus, according to one or more aspects, a TDP to determine whether a prepaid subscriber is allowed to make a call without contacting the SCP can be made part of the subscriber's Camel profile that can be retrieved from the HLR during the first call processing phase. This information can be used by the MSC or GMSC processing an outgoing or incoming call, respectively, for a prepaid mobile subscriber to determine whether to permit the call to go forward without the need to contact the SCP for a check of the subscriber's prepaid account balance, thus reducing the amount of signaling traffic between the MSC/GMSC and the SCP needed to process the call.

Figure 4:
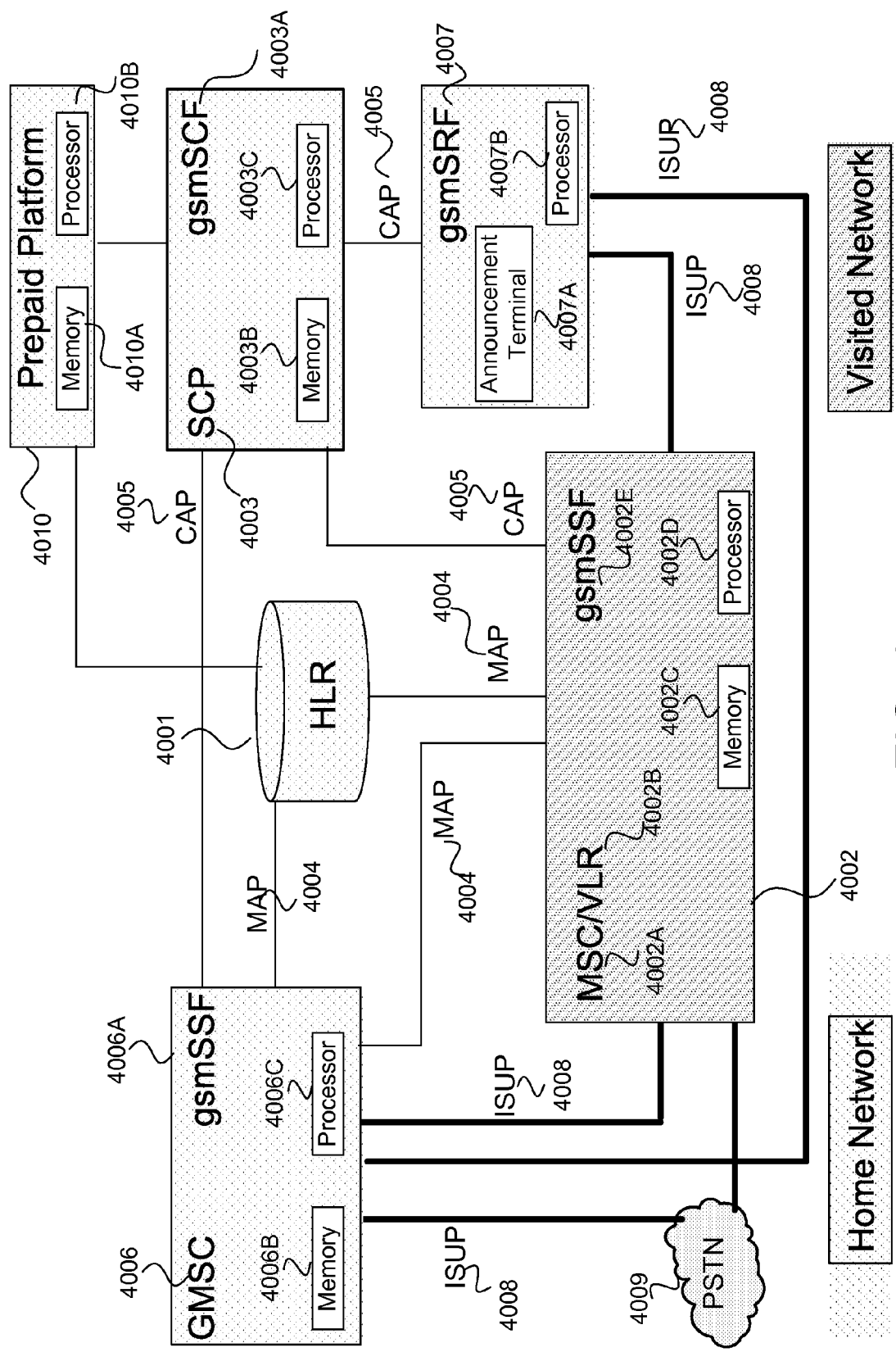
FIG. 4 is a block diagram depicting network elements in a Camel network according to one or more aspects described herein.

FIG. 4 depicts exemplary network elements that can be utilized in a Camel network in accordance with various aspects described herein. As in the exemplary Camel network shown in FIG. 1, signaling for call set up and call tear-down between network elements shown in FIG. 4 can be accomplished using ISDN User Part (ISUP) 4008, which is a part of the Signaling System #7 (SS7) communications protocol for signaling originating and terminating switching locations of telephone calls in a Public Switched Telephone Network (PSTN) 4009.

As shown in the configuration depicted in FIG. 4, an exemplary Camel network can include a Home Location Register (HLR) 4001, which can hold the Camel Subscription Information (CSI) for each subscriber in the Camel network, including the O-CSI that includes the set of TDPs governing the processing of an originating call and the T-CSI that includes the set of TDPs governing the processing of an incoming ("terminating") call.

The exemplary Camel network in accordance with aspects described herein shown in FIG. 4 also can include a Mobile Switching Center/Visiting Location Register (MSC/VLR) 4002 which operate in a manner similar to a conventional Camel network. The MSC/VLR 4002 can include a Mobile Switching Center (MSC) 4002A, memory 4002C, and processor 4002D that receives and processes a mobile subscriber's request to make a call, and a database of roaming mobile subscribers within the MSC's service area, known as a Visiting Location Register (VLR) 4002B. When a mobile subscriber enters an area served by MSC 4002A, the subscriber's location is updated in the HLR to point to VLR 4002B. During such an update, VLR 4002B also can be updated to include the subscriber's O-CSI from the HLR 4001 via MAP 4004.

According to aspects herein, the address for Service Control Point (SCP) 4003 in a subscriber's home network can be part of the subscriber's O-CSI obtained during an update of the VLR. MSC 4002A can then use the visiting mobile subscriber's O-CSI to govern processing of an outgoing mobile call originated by the subscriber. During outgoing call setup for a mobile subscriber, MSC/VLR 4002 can contact SCP 4003 using GSM Service Switching Function (gsmSSF) 4002E within MSC/VLR 4002 by way of Camel Application Part (CAP) protocol 4005, to inform SCP 4003 that the caller is a Camel subscriber and that the call should be processed by Service Control Function gsmSCF 4003A.

The exemplary Camel network shown in FIG. 4 also depicts network elements that can be used to process an incoming (terminating) call to a Camel mobile subscriber.

According to aspects herein, when a call is made to a mobile user in the network, the call can be received by a Gateway Mobile Switching Center 4006, which also includes GSM Service Switching Function (gsmSSF) 4006A, memory 4006B, and processor 4006C. As shown in FIG. 4 and in accordance with aspects herein, when an incoming call directed to a mobile subscriber in a Camel network is received, GMSC 4006 can fetch the terminating mobile subscriber's T-CSI from that mobile subscriber's HLR 4001 via MAP 4004. Once the T-CSI is received from the HLR 4001, in a similar manner as for an outgoing call, GMSC 4006 can contact SCP 4003 using gsmSSF 4006A within GMSC 4006 by way of Camel Application Part (CAP) protocol 4005 to inform SCP 4003 that the called party is a Camel subscriber and that the call should be processed by Service Control Function gsmSCF 4003A.

In the exemplary Camel network shown in FIG. 4, there is also shown Prepaid Platform 4010, which includes memory 4010A and 4010B, and which is communicatively connected to SCP 4003 by appropriate means. In accordance with aspects described herein, memory 4010A in Prepaid Platform 4010 can contain information regarding the status of prepaid subscriber's account, including account balance, call charging history, and special rate information, if any. As shown in FIG. 4, Prepaid Platform 4010 is also communicatively connected to HLR 4001 by means of a command interface understandable by the HLR. In accordance with one or more aspects herein, if a prepaid subscriber is eligible to complete a call, for example, because the subscriber's prepaid account balance is sufficient to cover the call or because a party to the call is in a special location or the call is at a special time, Prepaid Platform 4010 can instruct HLR 4001 to arm one or more TDPs in the subscriber's CSI to permit a call to be completed without requiring further inquiry of Prepaid Platform 4010 and to suppress other TDPs in HLR 4001. In accordance with aspects described in more detail herein, these TDPs may be referred to as "O-Answer" for an originating call made by a prepaid subscriber or "T-Answer" for a terminating call made to a prepaid subscriber. These armed TDPs can become part of the prepaid subscriber's O-CSI or T-CSI that is received from the HLR during call processing and can permit a call to be completed without the need for additional signaling to the SCP and/or the Prepaid Platform.

In accordance with other aspects, Prepaid Platform 4010 can determine that the prepaid subscriber is not eligible to automatically complete a call, for example, because the subscriber's prepaid account balance is too low. If such is the case, Prepaid Platform 4010 can instruct HLR 4001 to suppress the O-Answer and T-Answer TDPs and to arm TDPs "Collected Information" for an outgoing call and "Terminating Attempt Authorized" for an incoming call. Calls processed using these TDPs can be processed in a conventional manner as described above with respect to FIGS. 2A-2C and 3A-3C.

FIG. 4 also depicts Specialized Resource Function gsmSRF 4007 that may contain an Announcement Terminal 4007A as an element of a Camel network in accordance with one or more aspects described herein. The SCP can instruct the MSC/VLR or GMSC, via Camel operation Establish Temporary Connection, to set up a speech path to gsmSRF 4007. The gsmSRF, in turn, contacts the SCP 4003 via CAP 4005, which enables gsmSRF 4007 to play one or more messages to a caller. For example, in accordance with one or more aspects described herein, processor 4010B in Prepaid Platform 4010 may determine that the subscriber's prepaid account balance has fallen below a predetermined limit and that a call cannot be completed. In such a case, Prepaid Platform 4010 can instruct SCP 4003 to cause Announcement Terminal 4007A to play a message informing the subscriber that the balance in the caller's prepaid account is insufficient to permit the call to be completed.

Figure 5A:
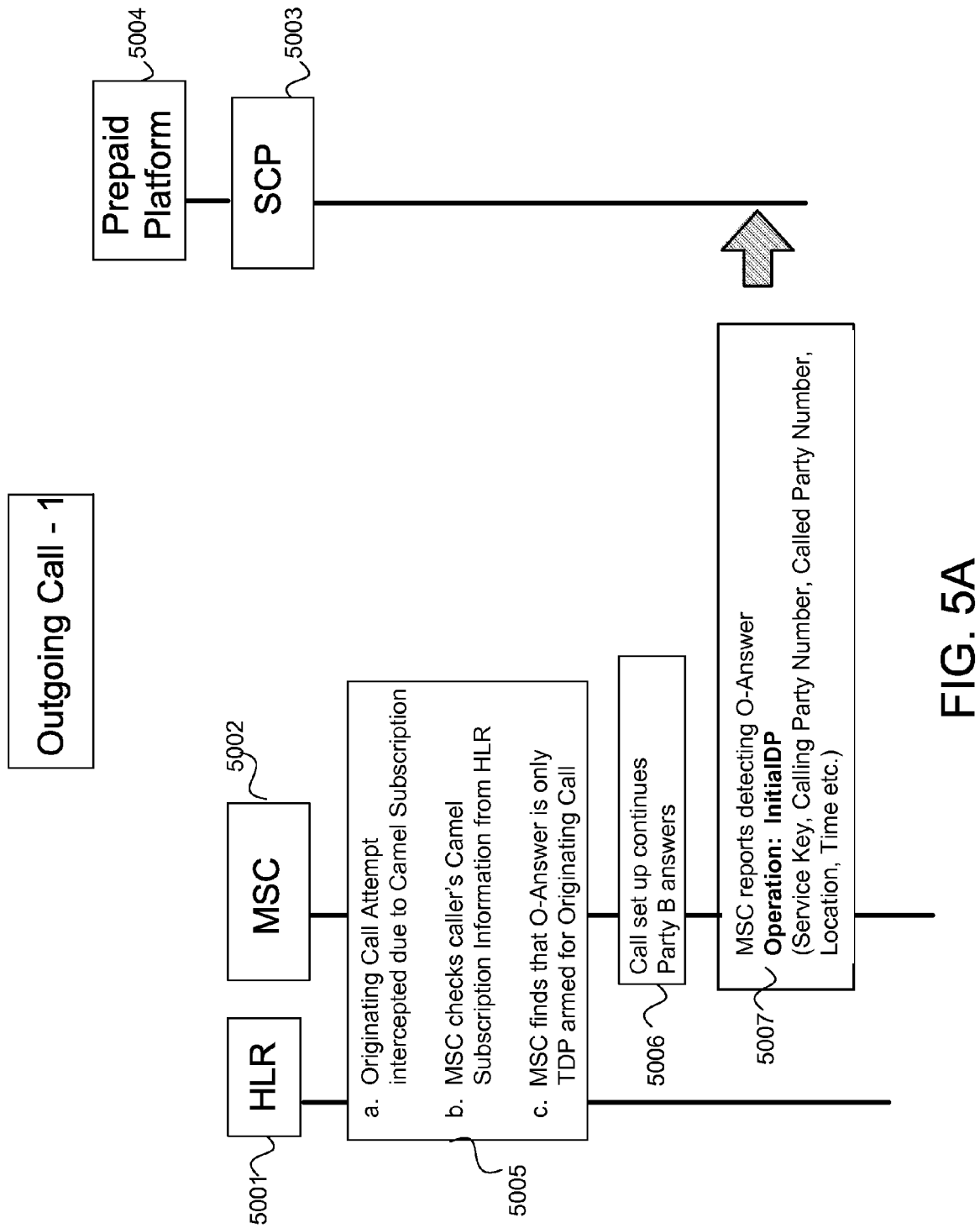
FIGS. 5A-5C depict a call flow in a Camel Originating Basic Call State Model in a mobile network according to one or more aspects described herein.
Figure 5B:
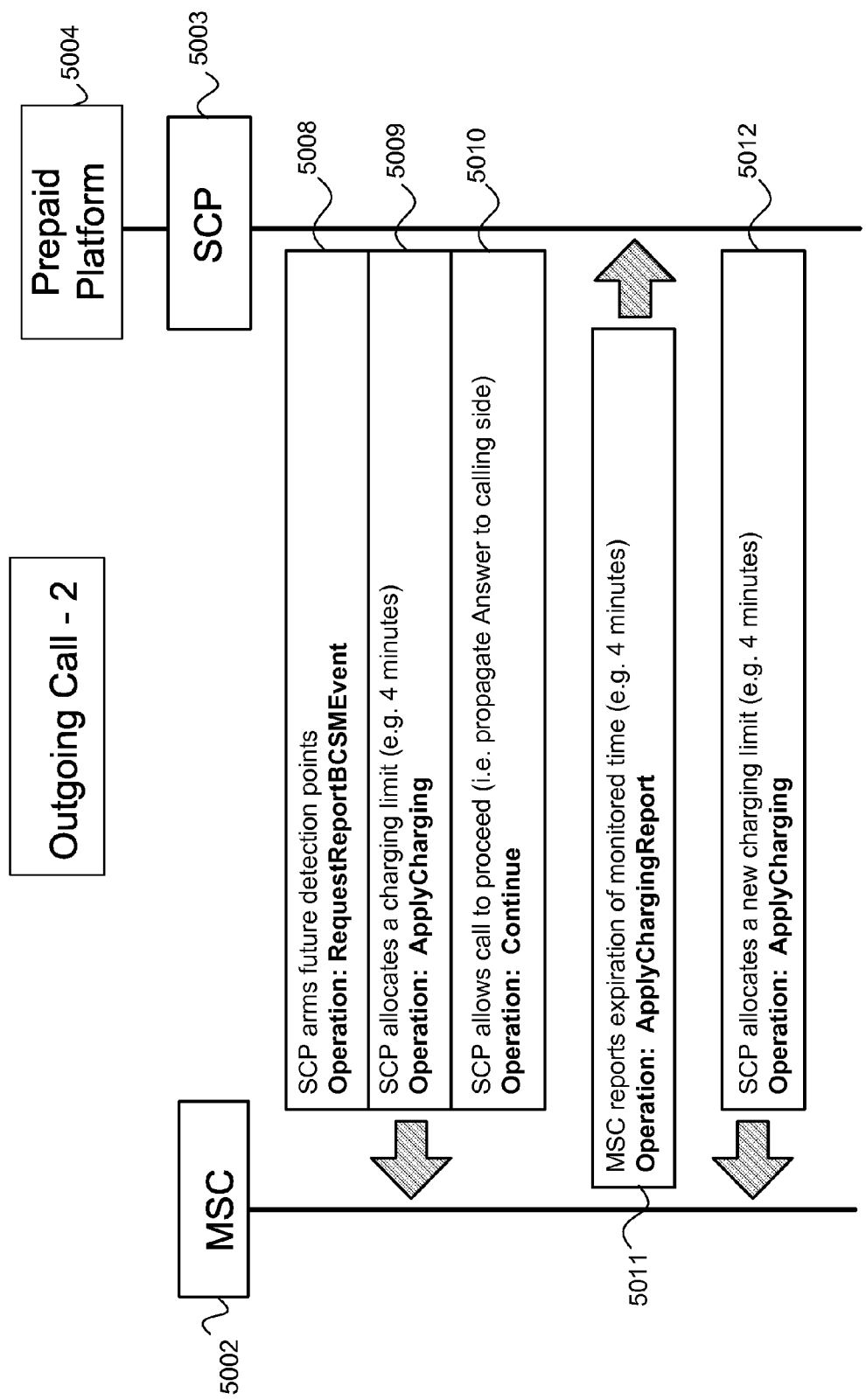
Figure 5C:
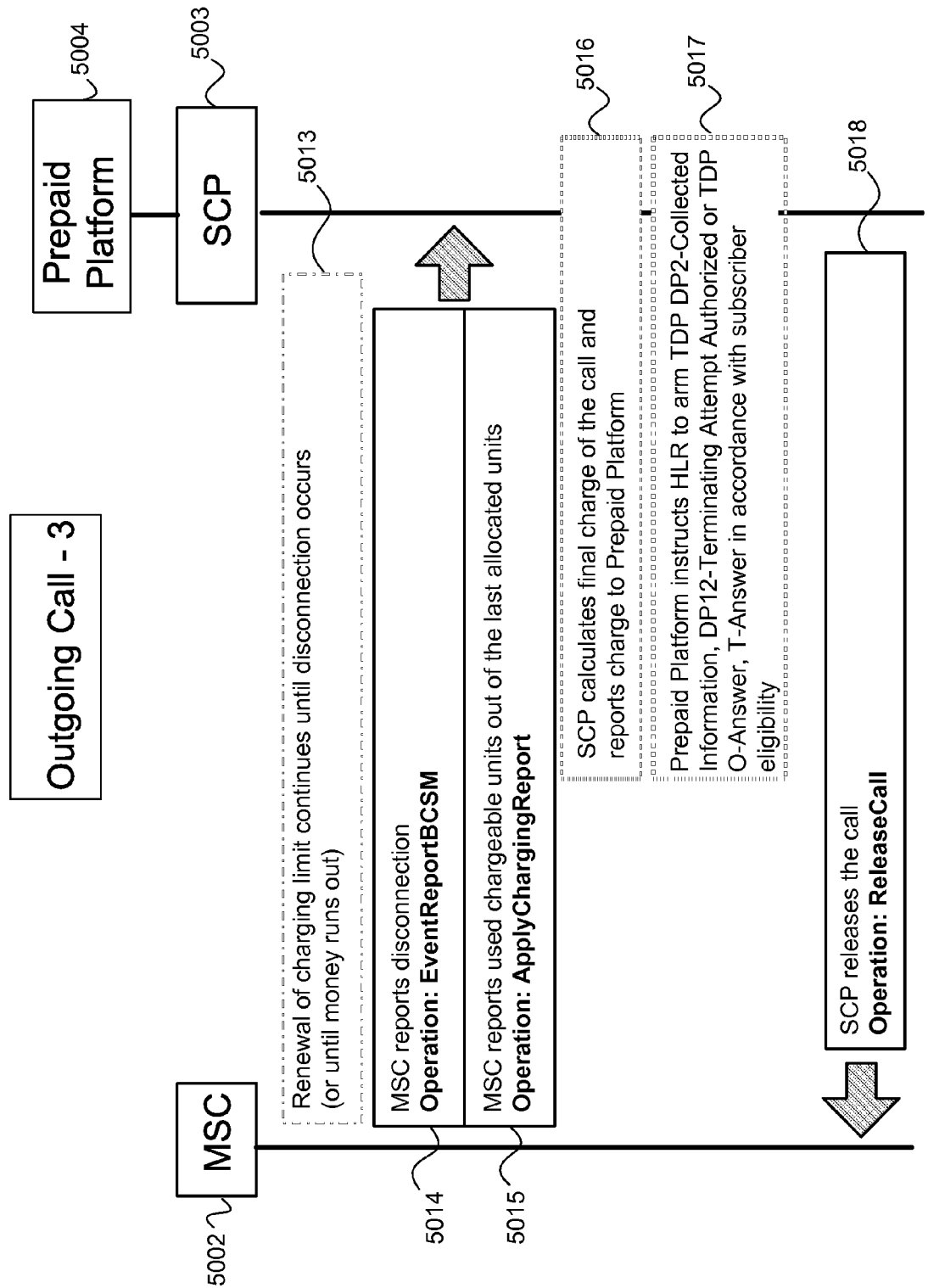

An exemplary call processing flow for an outgoing call in accordance with one or more aspects described herein is shown in FIGS. 5A-5C. An outgoing call flow in accordance with aspects herein can involve messaging between a Mobile Switching Center (MSC) 5002 and a Service Control Point (SCP) 5003. In accordance with one or more aspects, messaging can also occur between MSC 5002 and HLR 5001, between SCP 5003 and Prepaid Platform 5004, and between Prepaid Platform 5004 and HLR 5001. Step 5005 describes an exemplary logic flow that can be performed by MSC 5002 to determine whether a prepaid mobile subscriber's outgoing call can be completed. At step 5005(*a*), an Originating Call Attempt by a prepaid mobile subscriber can be intercepted due to the presence of a Camel subscription in the network. At step 5004(*b*), MSC 5002 can check the caller's Originating Camel Subscription Information (O-CSI) that was received from HLR 5001. As indicated above, the caller's O-CSI can include a set of TDPs that can govern the processing of an outgoing call attempted by a prepaid mobile subscriber. In accordance with aspects described in more detail below, if the caller has a high prepaid account balance or is otherwise eligible to complete a call, the Prepaid Platform 5004 can have previously instructed HLR 5001 to arm the Trigger Detection Point (TDP) "O-Answer" in the caller's O-CSI and to suppress other TDPs such as the TDP "Collected Info." The identity and parameters of the TDP that is armed in the HLR (i.e. the arming of O-Answer and suppression of Collected Information) can be immediately communicated to MSC 5002 when it receives the caller's O-CSI from the HLR. Thus, at 5005(*c*), MSC 5002 can check the caller's O-CSI profile and can determine that "O-Answer" is the only armed TDP and thus is the only TDP that can govern the flow of the call to the next state. Thus, since the TDP "O-Answer" is armed, at step 5005, the call set up can continue and the called party can answer. MSC 5002 can subsequently receive an indication that the called party has answered, and at step 5007, MSC 5002 can report the answer to SCP 5003 via Operation: Initial DP. As seen in FIG. 5A, in accordance with one or more aspects herein, this can be the first communication between MSC 5002 and SCP 5003 in the call. Thus, in accordance with one or more aspects described herein, initial processing relating to authorizing the call can be made by MSC 5002 based on the caller's CSI information without the need for communication with SCP 5003, thereby reducing the communication traffic needed to process the call.

On the other hand, if the caller's prepaid balance is below the threshold amount or the caller is otherwise ineligible to complete a call, the Prepaid Platform 5004 can instruct HLR 5001 to suppress TDP "O-Answer" and arm the TDP "Collected Info." This change in arming in of TDPs in the HLR (i.e. suppression of O-Answer and activation of Collected Information) can be immediately communicated to MSC 5002. In that case, the call processing can occur in the conventional fashion shown in FIGS. 2A-2C.

Call processing in accordance with aspects described herein after the called party answers is shown in FIGS. 5B and 5C. As shown in FIG. 5B, at step 5008, SCP 5003 can arm one or more future EDPs in the call, for example, an EDP for call disconnect, via, for example, Operation: RequestReportBC-SMEvent and can advise MSC 5002 of those EDPs. At step 5009, via Operation ApplyCharging SCP 5003 can allocate a charging limit, for example, 4 minutes, for the next call segment to ensure that the prepaid caller does not exceed her prepaid balance or other eligibility to continue the call, and can instruct MSC 5002 to check for the expiration of that time during the call. At step 5010, SCP 5003 can allow the call to continue via Operation: Continue. At step 5011, MSC 5002 can report back to SCP 5003 via Operation: ApplyChargingReport that the monitored time has expired, e.g., that 4 minutes has expired. SCP 5003 can then check the caller's prepaid account balance or other eligibility in Prepaid Platform 5004 and if sufficient funds remain or the caller is otherwise eligible, can repeat the allocation of a new charging limit via Operation: ApplyCharging at step 5012.

At step 5013 shown in FIG. 5C, the monitoring and renewal of the charging limit shown in steps 5009, 5011, and 5012 can continue until the call is disconnected by the parties or until the prepaid subscriber's balance reaches a point where SCP 5003 determines that the call should no longer continue or the caller is otherwise ineligible to continue the call. If the caller is ineligible to continue, for example, because the caller's prepaid balance is too low, SCP 5003 can instruct the call to be disconnected and can cause a message to be played via Announcement Terminal 4007A shown in FIG. 4 to advise the caller of her ineligibility to continue the call. At step 5014, after the call is disconnected, whether by the parties or because of insufficient funds, MSC 5002 can report the call disconnection to SCP 5003 via Operation: EventReport-BCSM and at step 5015 can report chargeable units used out of the last allocated units via Operation: ApplyChargingReport. At step 5016, SCP 5003 can calculate the final charges for the call so that the prepaid subscriber's account may be debited accordingly and can report the charge to Prepaid Platform 5004. At step 5017, Prepaid Platform can instruct HLR 5001 to arm a TDP in the subscriber's O-CSI and to suppress other TDPs. In accordance with aspects described herein, if the subscriber is no longer eligible to make or receive a call without further instruction from Prepaid Platform 5004, for example, because the subscriber's account balance is now below a predetermined threshold, because the subscriber is subject to a special billing rate, or otherwise, Prepaid Platform 5004 can instruct HLR 5001 to suppress the TDPs O-Answer and T-Answer and arm the TDPs DP2-Collected Information and DP12-Terminating Attempt Authorized. In accordance with one or more aspects, the TDPs DP2-Collected Information and DP12-Terminating Attempt Authorized can thus be armed and available to control processing of the next call placed or received by the subscriber. Alternatively, in accordance with aspects described herein, the SCP can decide that the prepaid subscriber is eligible to make a call without further instruction from the Prepaid Platform 5004, for example, because the subscriber's prepaid balance is sufficiently high due to a replenishment of the account during the call (e.g. at 5 PM each Friday, the account is replenished with a certain amount from his credit card or other financial instrument or institution), due to some promotion, or otherwise. In such a case, Prepaid Platform 5004 can instruct HLR 5001 to arm the TDPs O-Answer and T-Answer and suppress the TDPs DP2-Collected Information and DP12-Terminating Attempt Authorized for use in the next call. At step 5018, SCP 5003 can instruct MSC 5002 to release the call via Operation: ReleaseCall and the call can be completed. Alternatively, in accordance with aspects described herein, SCP 5003 can decide that the prepaid subscriber is eligible to receive a call without further instruction from the Prepaid Platform 5004, for example, because an incoming call is free or cheaper, but the prepaid subscriber is not eligible to make an outgoing call without further instruction from the Prepaid Platform 5004. In such case, the Prepaid Platform 5004 can instruct HLR 5001 to arm TDPs DP2-Collected Information and T-Answer and suppress TDPs DP12-Terminating Attempt Authorized and O-Answer.

Figure 6A:
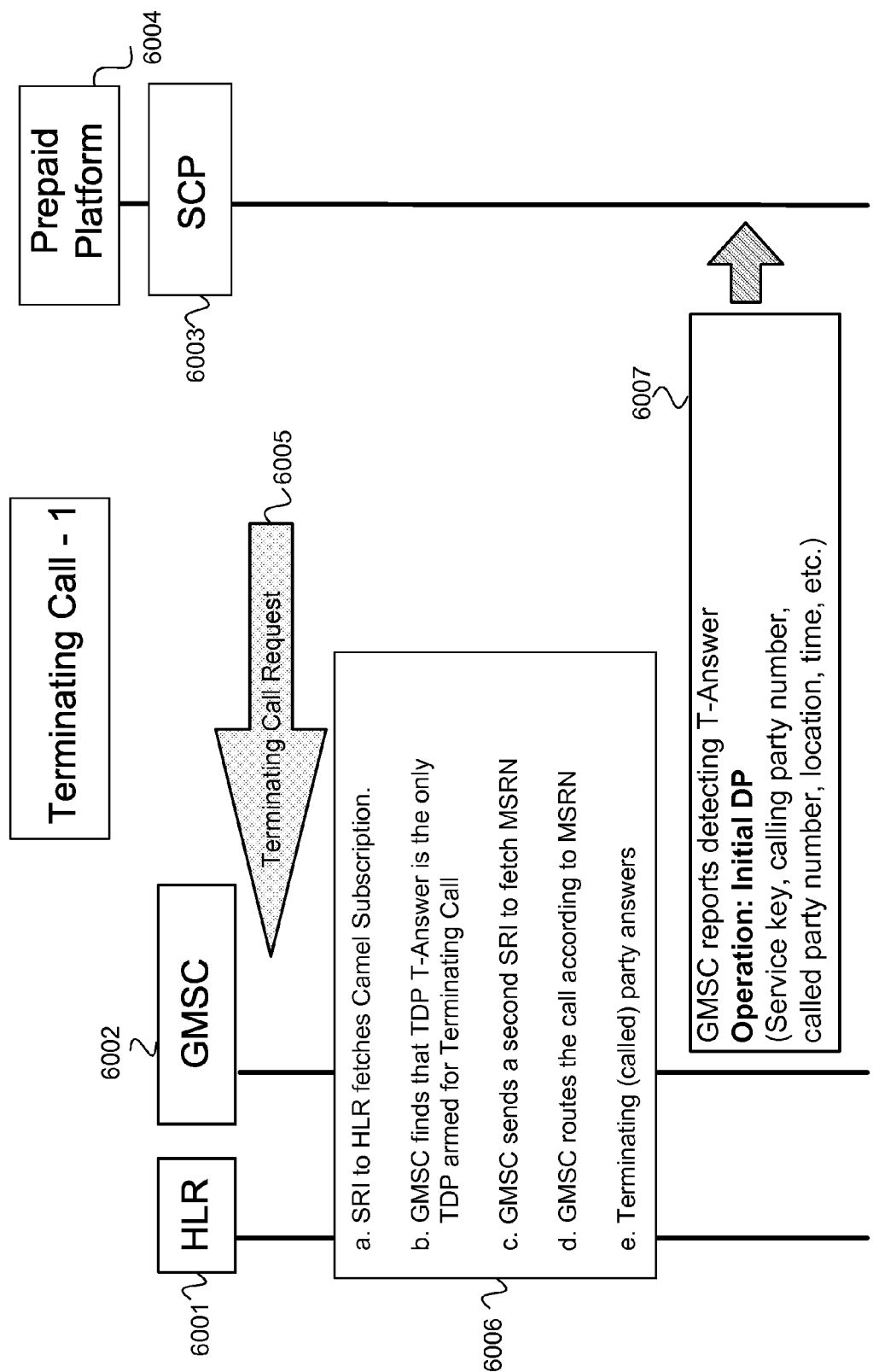
FIGS. 6A-6C depict a call flow in a Camel Terminating Basic Call State Model in a mobile network according to one or more aspects described herein.
Figure 6B:
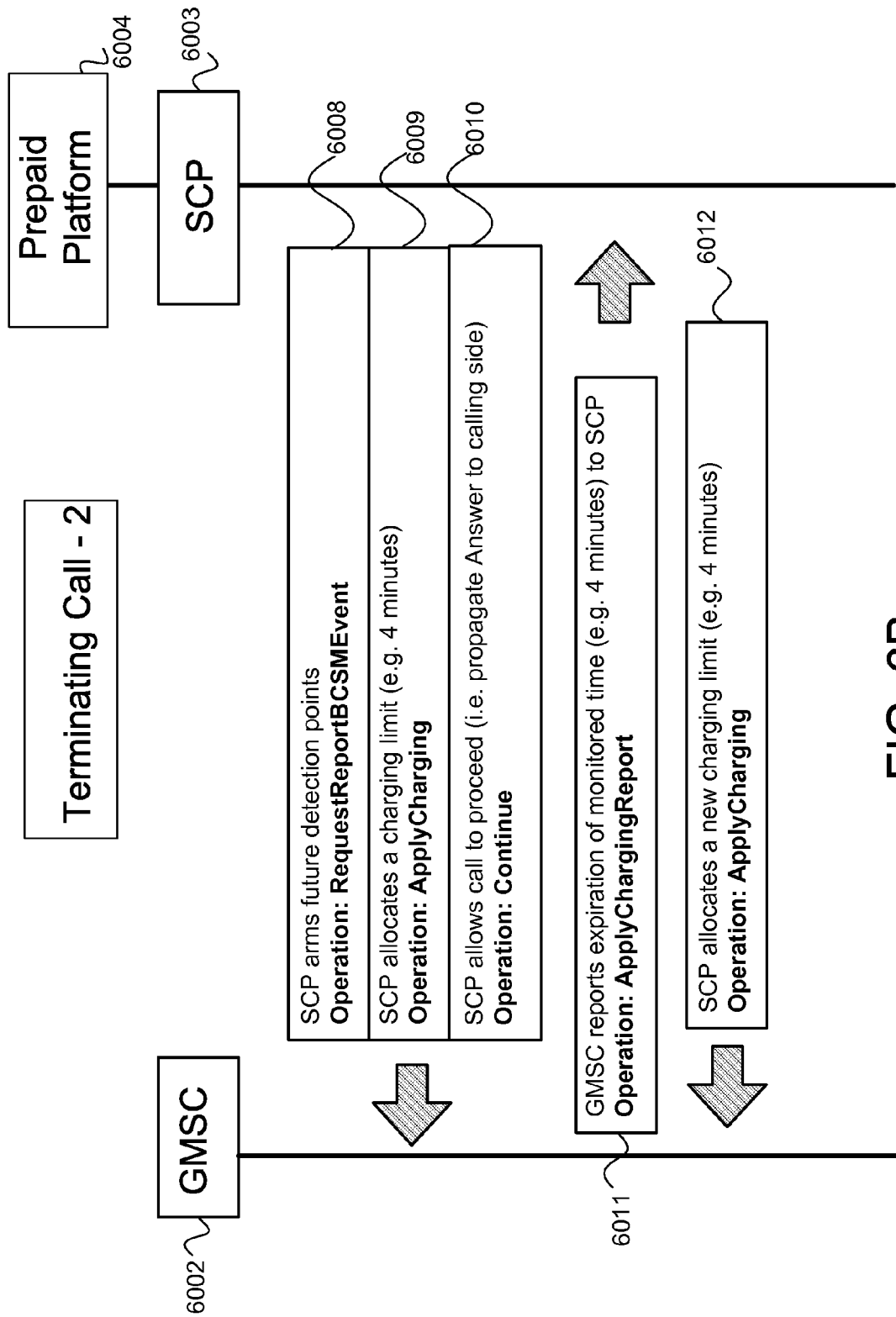
Figure 6C:
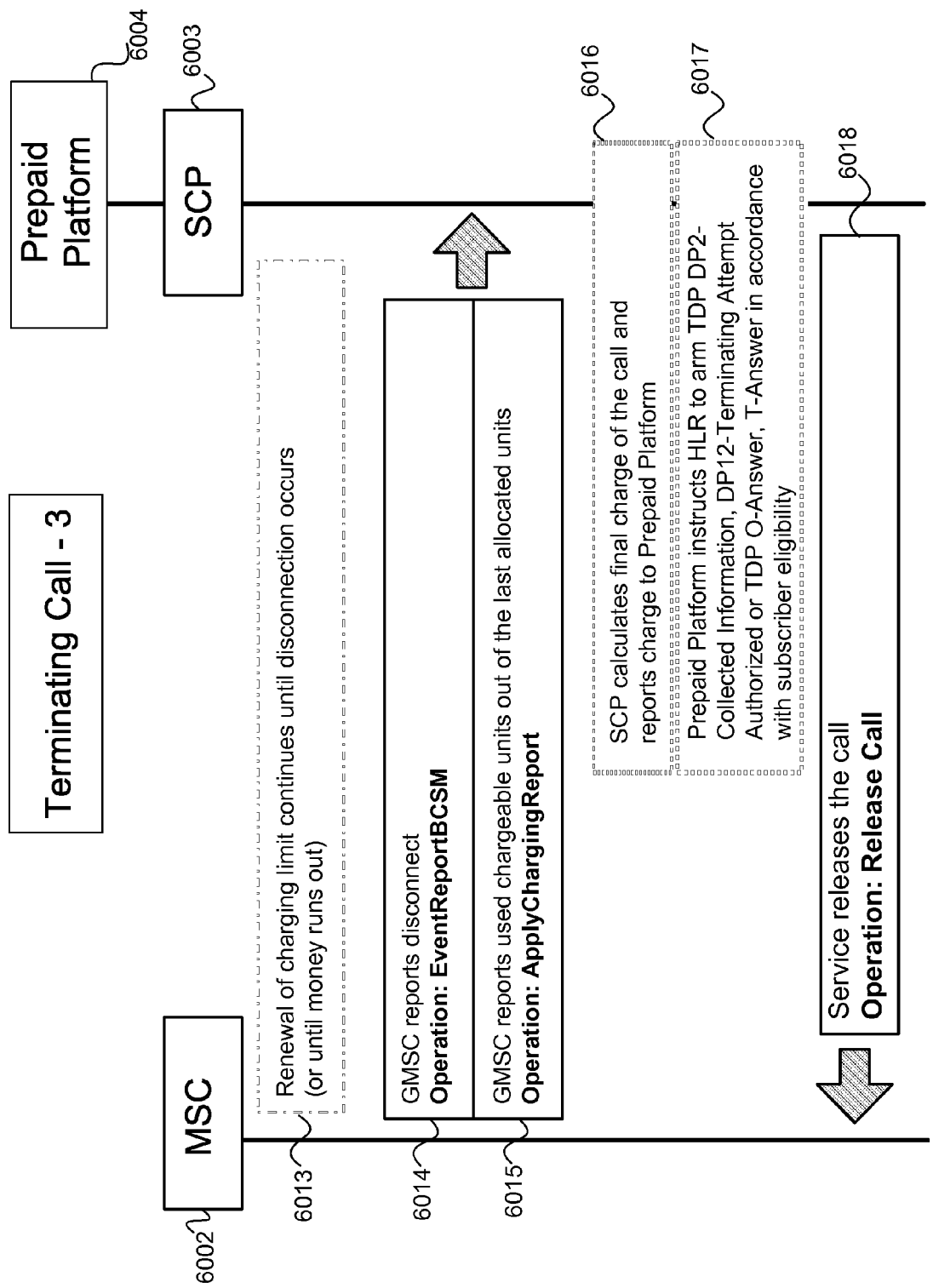

Similarly, an exemplary call processing flow for a Terminating Call to a prepaid mobile subscriber in accordance with one or more aspects described herein is shown in FIGS. 6A-6C. As seen in FIG. 6A, a terminating call can involve messaging among a Home Location Register (HLR) 6001, a Gateway Mobile Switching Center (GMSC) 6002, and a Service Control Point (SCP) 6003. In accordance with one or more aspects, messaging can also occur between SCP 6003 and Prepaid Platform 6004, and between Prepaid Platform 6004 and HLR 6001. In the exemplary call processing flow shown in FIG. 6A, a Terminating Call Request 6005, for example, an incoming call to a prepaid mobile subscriber in a Camel network, is directed to GMSC 6002. Steps 6005(*a*)-(*e*) describe an exemplary logic flow that can be performed by GMSC 6002 to determine whether a prepaid mobile subscriber's incoming call can be completed. At Step 6005(*a*), upon receipt of the Terminating Call Request 6005, GMSC 6002 can fetch the called party's Terminating Camel Subscription Information (T-CSI) from HLR 6001 by means of an SRI request known in the art. In a manner similar to the case for an originating call made by a prepaid mobile subscriber, a terminating party's T-CSI can include a set of TDPs that can govern the processing of an incoming call directed to the prepaid mobile subscriber as a terminating party. In accordance with aspects described in more detail below, if the terminating party has a high prepaid account balance or is otherwise eligible to receive a call, the Prepaid Platform 6004 can have previously instructed HLR 6001 to arm the TDP "T-Answer" in the terminating party's T-CSI and to suppress other TDPs such as the TDP "Terminating Attempt Authorized." Thus, GMSC 6002 can check the terminating party's T-CSI retrieved from HLR 6001 and, at step 6005(*b*), can determine that "T-Answer" is the only armed TDP and thus the only TDP that can govern the flow of the call to the next state. Following this determination, according to aspects herein, at step 6005(*c*), GMSC 6002 can send a second message to HLR 6001 to fetch a Mobile Station Routing Number (MSRN) for use in completing the call, and at step 6005(*d*), can route the call to the terminating party according to the fetched MSRN. Upon completion of these steps, at step 6005 (*e*), the terminating party can answer the call. At step 6007, after the terminating party has answered the call, GMSC 6002 can report additional information regarding the call to SCP 6003, for example, a service key for the call, the calling party number, the called party number, location of the called party, or time of the call, via Operation: Initial DP. As seen in FIG. 6A, in accordance with one or more aspects herein, this communication between GMSC 6002 and SCP 6003 at step 6007 can be the first communication between GMSC 6002 and SCP 6003 during the call, with prior processing having taken place by means of communications between GMSC 6002 and HLR 6001. This can result in a reduction in signaling traffic needed to process the call, since a message may not need to pass between GMSC 6002 and SCP 6003 until after the call has been answered, and may not be needed to process the call prior to that point.

On the other hand, if the terminating party's prepaid balance is below the threshold amount or the terminating party is otherwise ineligible to receive a call, Prepaid Platform 6004 can notify HLR 6001 to suppress TDP "T-Answer" and arm the TDP "Terminating Attempt Authorized." In that case, the call processing can occur in the conventional fashion shown in FIGS. 3A-3C.

Call processing in accordance with aspects described herein after the terminating party answers is shown in FIGS. 6B and 6C. As shown in FIG. 6B, at step 6008, SCP 6003 can arm a future TDP for further call processing, for example, a TDP for disconnection of the call, via Operation: RequestReportBCSMEvent and can advise GMSC 6002 of those TDPs. At step 6009, via Operation: ApplyCharging, SCP 6003 can allocate a charging limit, for example, 4 minutes, for the next call segment, and can instruct GMSC 6002 to monitor for the expiration of this time period. At step 6010, SCP 6003 can allow the call to continue via Operation: Continue. GMSC 6002 can then monitor the time used in the call, and at step 6011, can report to SCP 6003 via Operation: ApplyChargingReport that the monitored time has expired, i.e., in this example, that 4 minutes has expired. SCP 6003 then can recheck the terminating party's prepaid account balance in Prepaid Platform 6004, and if sufficient funds remain, can repeat the allocation of a new charging limit via Operation: ApplyCharging at step 6012.

As seen in FIG. 6C, in step 6013, the monitoring and renewal of charging limits seen in steps 6009, 6011, and 6012 of FIG. 6B can continue until either disconnection of the terminating call by the parties occurs or the prepaid terminating party is no longer eligible, for example, because her prepaid balance reaches a point where SCP 6003 determines that the call should no longer continue. If the balance is too low to permit the call to continue or the terminating party is no longer eligible, SCP 6003 can instruct the call to be disconnected and can cause a message to be played via the Announcement Terminal 4007A shown in FIG. 4. At step 6014, after the call is disconnected, whether by the parties or because the terminating party is no longer eligible, for example, due to insufficient prepaid funds, GMSC 6002 can report disconnection of the call to SCP 6003 via Operation: EventReportBCSM and at step 6015 can report the chargeable time units used out of the last time units allocated for the call via Operation: ApplyChargingReport. At step 6016, SCP 6003 can calculate a final charge for the call so that the terminating party's prepaid account can be debited accordingly and can report the charge to Prepaid Platform 6004. At step 6017, Prepaid Platform 6004 can instruct HLR 6001 to arm a TDP in the terminating subscriber's T-CSI and to suppress other TDPs. In accordance with aspects described herein, if the subscriber is not eligible to make or receive a call without further instruction from Prepaid Platform 6004, for example, because the subscriber's account balance is below a predetermined threshold or because the subscriber is subject to a special billing rate, at step 6017, Prepaid Platform 6004 can instruct HLR 6001 to suppress the TDPs O-Answer and T-Answer and arm the TDPs DP2-Collected Information and DP12-Terminating Attempt Authorized. Thus, in accordance with one or more aspects, the TDPs DP2-Collected Information and DP12-Terminating Attempt Authorized can be armed and available to control processing of the next call to be received by the subscriber. Alternatively, in accordance with aspects described herein, the SCP can decide that the prepaid subscriber is eligible to make or receive a call without further instruction from the Prepaid Platform 6004, for example, because the subscriber's prepaid balance is sufficiently high due to a replenishment of the account during the call (e.g. at 5 PM each Friday, the account is replenished with a certain amount from his credit card or other financial instrument or institution), due to some promotion, or otherwise. In such a case, Prepaid Platform 6004 can instruct HLR 6001 to arm the TDPs O-Answer and T-Answer and suppress the TDPs DP2-Collected Information and DP12-Terminating Attempt Authorized for use in the next call. At step 6018, via Operation: ReleaseCall, SCP 6003 can instruct GMSC 6002 to release the call and the call is completed. Alternatively, in accordance with aspects described herein, SCP 6003 can decide that the prepaid subscriber is eligible to receive a call without further instruction from the Prepaid Platform 5004, for example, because an incoming call is free or cheaper, but the prepaid subscriber is not eligible to make an outgoing call without further instruction from the Prepaid Platform 5004. In such case, the Prepaid Platform 5004 can instruct HLR 5001 to arm TDPs DP2-Collected Information and T-Answer and suppress TDPs DP12-Terminating Attempt Authorized and O-Answer.

Thus, for both an outgoing and an incoming call processed in accordance with aspects described herein, there can be a reduction in the signaling traffic needed to process the call.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

I claim:

1. A method for processing a request for a prepaid outgoing call in a telecommunications network, comprising:
   receiving a signal indicative of a request for an outgoing call to a called party by a prepaid subscriber in the network; and
   processing the request for an outgoing call in accordance with a first detection point, the first detection point being armed in accordance with eligibility of the prepaid subscriber to complete the outgoing call, the first detection point being one of a plurality of detection points associated with making an outgoing call by the prepaid subscriber, the processing comprising suppressing others of the plurality of detection points;
   wherein the others of the plurality of detection points include a Collected Information Trigger Detection Point,
   wherein the processing further comprises:
   identifying, based on the first detection point, that the prepaid subscriber is eligible to complete the call without further instruction from a prepaid platform, the eligibility of the prepaid subscriber to complete the call being based on the prepaid subscriber's account balance being above a predetermined threshold.

2. The method for processing a request for a prepaid outgoing call according to claim 1, wherein the eligibility of the prepaid subscriber is based on the prepaid subscriber's prepaid account balance.

3. The method for processing a request for a prepaid outgoing call according to claim 2, further comprising completing the request for an outgoing call if the prepaid subscriber's prepaid account balance is above a predetermined threshold.

4. The method for processing a request for a prepaid outgoing call according to claim 1, wherein the eligibility of the prepaid subscriber to complete the call is based on one of a location of the prepaid subscriber and a location of the called party.

5. The method for processing a request for a prepaid outgoing call according to claim 1, wherein the eligibility of the prepaid subscriber to complete the call is based on a time of the outgoing call.

6. The method for processing a request for a prepaid outgoing call according to claim 1, wherein the eligibility of the prepaid subscriber to complete the call is based on a presence of a special promotion.

7. The method for processing a request for a prepaid outgoing call according to claim 1, further comprising sending a signal causing a message to be played to the prepaid subscriber, the message including one of information relating to the prepaid subscriber's eligibility and information relating to a status of the call.

8. The method for processing a request for a prepaid outgoing call according to claim 1, further comprising:
   receiving a signal indicative of a first time period of the call;
   sending a signal indicative of an expiration of the first time period; and
   receiving a signal indicative of a second time period of the call if the prepaid subscriber is eligible to continue the call.

9. The method for processing a request for a prepaid outgoing call according to claim 8, further comprising receiving a signal instructing that the call be terminated if the prepaid subscriber is not eligible to continue the call.

10. A system for processing a request for a prepaid outgoing call by a prepaid subscriber in a telecommunications network, comprising:
    a first processor configured to arm a first detection point associated with a request for an outgoing call to a called party by a prepaid subscriber in accordance with eligibility of the prepaid subscriber to complete the outgoing call, the first detection point being one of a plurality of detection points associated with making an outgoing call by the prepaid subscriber; and
    a second processor configured to process the request for an outgoing call in accordance with the first detection point, the processing comprising suppressing others of the plurality of detection points;
    wherein the others of the plurality of detection points include a Collected Information Trigger Detection Point,
    wherein the first detection point indicates that the prepaid subscriber is eligible to complete the call without further instruction from a prepaid platform based on the prepaid subscriber's account balance being above a predetermined threshold.

11. The system for processing a request for a prepaid outgoing call according to claim 10, wherein the eligibility of the prepaid subscriber is based on the prepaid subscriber's prepaid account balance.

12. The system for processing a request for a prepaid outgoing call according to claim 10, wherein the eligibility of the prepaid subscriber is based on one of a location of the prepaid subscriber and a location of the called party.

13. The system for processing a request for a prepaid outgoing call according to claim 10, wherein the eligibility of the prepaid subscriber to complete the call is based on a time of the outgoing call.

14. The system for processing a request for a prepaid outgoing call according to claim 10, wherein the eligibility of the prepaid subscriber to complete the call is based on a presence of a special promotion.

15. The system for processing a request for a prepaid outgoing call according to claim 10, further comprising a third processor, the third processor having a memory and being capable of receiving and sending messages relating to the request for a prepaid outgoing call;

wherein the request for an outgoing call is processed by said second and third processors in accordance with the first detection point based on the eligibility of the prepaid subscriber.

16. The system for processing a request for a prepaid outgoing call according to claim 15, the third processor being further configured to send a first signal to said second processor indicative of a first time period for the call;

the second processor being configured to monitor a time of the call and being further configured to send a second signal to the third processor at the expiration of the first time period, said second signal being indicative of the expiration of the first time period;

the third processor being further configured to send a third signal to the second processor if the prepaid subscriber is eligible to continue the call, the third signal being indicative of a second time period for the call.

17. The system for processing a request for a prepaid outgoing call according to claim 16, the third processor being configured to send a termination signal to the second processor instructing that the call be terminated if the prepaid subscriber is not eligible to continue the call.

18. The system for processing a request for a prepaid outgoing call according to claim 10, further comprising a fourth processor, the fourth processor having a memory capable of storing a message, the message including one of information relating to the prepaid subscriber's eligibility and information relating to a status of the call, the fourth processor further having means for playing the message to the prepaid subscriber.

\* \* \* \* \*